US007996364B2

(12) United States Patent
Uchida

(10) Patent No.: US 7,996,364 B2
(45) Date of Patent: Aug. 9, 2011

(54) INFORMATION PROCESSING APPARATUS AND CONTROL METHOD THEREOF, AND DOCUMENT VERIFICATION APPARATUS AND CONTROL METHOD THEREOF

(75) Inventor: Hitoshi Uchida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 12/245,684

(22) Filed: Oct. 3, 2008

(65) Prior Publication Data
US 2009/0094273 A1    Apr. 9, 2009

(30) Foreign Application Priority Data

Oct. 5, 2007   (JP) ................. 2007-262729
Oct. 2, 2008   (JP) ................. 2008-257437

(51) Int. Cl.
*G06F 7/00*    (2006.01)
*G06F 17/00*   (2006.01)

(52) U.S. Cl. ...................... 707/638; 707/695

(58) Field of Classification Search ............ None
See application file for complete search history.

(56) References Cited

U.S. PATENT DOCUMENTS 5,819,300 A       10/1998  Kohno et al. ............. 707/511
7,818,665 B1 *    10/2010  Russin et al. ............. 715/236
2005/0149543 A1 *  7/2005  Cohen et al. ............. 707/100

FOREIGN PATENT DOCUMENTS

JP            7-200370       8/1995

\* cited by examiner

*Primary Examiner* — Neveen Abel-Jalil
*Assistant Examiner* — Kellye D Buckingham
(74) *Attorney, Agent, or Firm* — Fitzpatrick, Cella, Harper & Scinto

(57) ABSTRACT

In order to provide a technique that allows to efficiently check validation of a structured document using single schema data corresponding to structured documents of different versions, a document verification apparatus, which includes a storage unit that stores single schema data corresponding to structured documents of different versions, and checks validation of structured document data using the single schema data, includes an input unit which inputs structured document data, a version determination unit which determines a version of the input structured document data, and a generation unit which reads out the single schema data from the storage unit, and generates a DOM tree of a schema corresponding to the determined version, and a verification unit which executes validation checking of the structured document based on the generated DOM tree.

21 Claims, 32 Drawing Sheets

FIG. 1

```
ADDRESS BOOK ver0.1
<book>
    <person id="1">
        <name>suzuki</name>
        <address>Tokyo</address>
    </person>
    <person id="2">
        <name>tanaka</name>
        <address>Kanagawa</address>
    </person>
</book>
```

FIG. 2

```
SCHEMA OF ver0.1
<grammar xmlns="http://relaxng.org/ns/structure/1.0"
  datatypeLibrary="http://www.w3.org/2001/XMLSchema-datatypes">
  <start>
    <element name="book">
      <oneOrMore>
        <ref name="person"/>
      </oneOrMore>
    </element>
  </start>
  <define name="person">
    <attribute name="id">
      <data type="unsignedByte"/>
    </attribute>
    <element name="person">
      <element name="name">
        <data type="string"/>
      </element>
      <element name="address">
        <data type="string"/>
      </element>
    </element>
  </define>
</grammar>
```

FIG. 3

ADDED ELEMENT

```
ADDRESS BOOK ver0.2
<book>
    <person id="1">
        <name>suzuki</name>
        <address>Tokyo</address>
        <phone>03-1234-5678</phone>
    </person>
    <person id="2">
        <name>tanaka</name>
        <address>Kanagawa</address>
        <phone>045-123-4567</phone>
    </person>
</book>
```

FIG. 4

```
SCHEMA OF ver0.2
<grammar xmlns="http://relaxng.org/ns/structure/1.0"
  datatypeLibrary="http://www.w3.org/2001/XMLSchema-datatypes">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
      </attribute>
      <element name="name">
        <data type="string"/>
      </element>
      <element name="address">
        <data type="string"/>
      </element>
      <element name="phone">    ⎫
        <data type="string"/>    ⎬ SCHEMA OF ADDED phone ELEMENT
      </element>                 ⎭
    </element>
  </define>
</grammar>
```

FIG. 7

```
SCHEMA OF ver0.1
<grammar xmlns="http://relaxng.org/ns/structure/1.0"
 datatypeLibrary="http://www.w3.org/2001/XMLSchema-datatypes"
 xmlns:ver="http://versioning.org" ver:num="0.1">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
      </attribute>
      <element name="name">
        <data type="string"/>
      </element>
      <element name="address">
        <data type="string"/>
      </element>
    </element>
  </define>
</grammar>
```

FIG. 8

```
SCHEMA TO WHICH VERSION INFORMATION IS ADDED
<grammar xmlns="http://relaxng.org/ns/structure/1.0"
  datatypeLibrary="http://www.w3.org/2001/XMLSchema-datatypes"
  xmlns:ver="http://versioning.org" ver:num="0.1">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
      </attribute>
      <element name="name">
        <data type="string"/>
      </element>
      <element name="address">
        <data type="string"/>
      </element>
      <element name="phone" ver:add="0.2">   ⎫  SCHEMA OF phone
        <data type="string"/>                ⎬  ELEMENT ADDED IN ver0.2
      </element>                             ⎭
    </element>
  </define>
</grammar>
```

FIG. 9

```
SCHEMA TO WHICH VERSION INFORMATION IS ADDED
<grammar xmlns="http://relaxng.org/ns/structure/1.0"
 datatypeLibrary="http://www.w3.org/2001/XMLSchema-datatypes"
 xmlns:ver="http://versioning.org" ver:num="0.1">
  <start>
    <element name="book">
      <oneOrMore>
        <ref name="person"/>
      </oneOrMore>
    </element>
  </start>
  <define name="person">
    <element name="person">
      <attribute name="id" ver:delete="0.2">    ⎱ SCHEMA OF "id"
        <data type="unsignedByte"/>            ⎰ ATTRIBUTE DELETED IN ver0.2
      </attribute>
      <element name="name">
        <data type="string"/>
      </element>
      <element name="address">
        <data type="string"/>
      </element>
    </element>
  </define>
</grammar>
```

FIG. 10

```
SCHEMA TO WHICH VERSION INFORMATION IS ADDED
<grammar xmlns="http://relaxng.org/ns/structure/1.0"
 datatypeLibrary="http://www.w3.org/2001/XMLSchema-datatypes"
 xmlns:ver="http://versioning.org" ver:num="0.1">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
      </attribute>
      <element name="name">
        <ver:rename num="0.2">NAME</ver:name>   } DESIGNATE TO CHANGE ELEMENT NAME OF "name" ELEMEMT IN ver0.2
        <data type="string"/>
      </element>
      <element name="address">
        <data type="string"/>
      </element>
    </element>
  </define>
</grammar>
```

FIG. 11

```
SCHEMA TO WHICH VERSION INFORMATION IS ADDED
<grammar xmlns="http://relaxng.org/ns/structure/1.0"
 datatypeLibrary="http://www.w3.org/2001/XMLSchema-datatypes"
 xmlns:ver="http://versioning.org" ver:num="0.1">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>              ⎫ CHANGE DATA
          <ver:reType num="0.2">unsignedInt</ver:reType>  ⎬ TYPE OF "id"
        </data>                                  ⎭ ATTRIBUTE
      </attribute>                                 IN ver0.2
      <element name="name">
        <data type="string"/>
      </element>
      <element name="address">
        <data type="string"/>
      </element>
    </element>
  </define>
</grammar>
```

FIG. 12

```
SCHEMA WHICH MANAGES PLURAL VERSIONS
<grammar xmlns="http://relaxng.org/ns/structure/1.0"
 datatypeLibrary="http://www.w3.org/2001/XMLSchema-datatypes"
 xmlns:ver="http://versioning.org" ver:num="0.1">
  <start>
    <element name="book">
      <oneOrMore>
        <ref name="person"/>
      </oneOrMore>
    </element>
  </start>
  <define name="person">
    <element name="person">
      <attribute name="id" ver:delete="0.3">       ← DELETE IN ver0.3
        <data type="unsignedByte"/>                ← CHANGE DATA TYPE IN ver0.2
          <ver:reType num="0.2">unsignedInt</ver:reType>
        </data>
      </attribute>
      <element name="name">
        <data type="string"/>
      </element>
      <element name="address">                    ← ADD IN ver0.2
        <data type="string"/>                     ← CHANGE NAME IN ver0.3
      </element>
      <element name="phone" ver:add="0.2">
        <ver:rename num="0.3">PHONE</ver:rename>
        <data type="string"/>
      </element>
    </element>
  </define>
</grammar>
```

FIG. 15

```
ADDRESS BOOK OF ver0.2 INCLUDING VERSION INFORMATION
<book xmlns:ver="http://versioning.org" ver:num="0.2">
   <person id="1">
      <name>suzuki</name>
      <address>Tokyo</address>
      <phone>03-1234-5678</phone>
   </person>
   <person id="2">
      <name>tanaka</name>
      <address>Kanagawa</address>
      <phone>045-123-4567</phone>
   </person>
</book>
```

PART OF DOM OF ver0.1

PART OF DOM OF ver0.3

FIG. 23

```xml
<grammar xmlns="http://relaxng.org/ns/structure/1.0"
  datatypeLibrary="http://www.w3.org/2001/XMLSchema-datatypes"
  xmlns:ver="http://versioning.org">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
      </attribute>
      <ref name="birthday"/>
      <element name="name">
        <data type="string"/>
      </element>
      <element name="address">
        <data type="string"/>
      </element>
      <ref name="phone"/>
    </element>
  </define>
  <define name="phone" ver:num="0.2">
    <element name="phone">
      <data type="string"/>
    </element>
  </define>
  <define name="birthday" ver:num="0.3">
    <attribute name="birthday">
      <data type="date"/>
    </attribute>
  </define>
</grammar>
```

FIG. 24

```
SCHEMA OF ver0.1
<grammar xmlns="http://relaxng.org/ns/structure/1.0"
  datatypeLibrary="http://www.w3.org/2001/XMLSchema-datatypes">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
      </attribute>
      ref ELEMENT IS DELETED SINCE THERE IS NO define
      ELEMENT AS REFERENCE DESTINATION OF ref ELEMENT
      <element name="name">
        <data type="string"/>
      </element>
      <element name="address">
        <data type="string"/>
      </element>
      ref ELEMENT IS DELETED SINCE THERE IS NO define
      ELEMENT AS REFERENCE DESTINATION OF ref ELEMENT
    </element>
  </define>
  define ELEMENT OF phone ELEMENT IS DELETED
  define ELEMENT OF birthday ELEMENT IS DELETED
</grammar>
```

FIG. 25

```
SCHEMA OF ver0.2
<grammar xmlns="http://relaxng.org/ns/structure/1.0"
  datatypeLibrary="http://www.w3.org/2001/XMLSchema-datatypes">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
      </attribute>
      ref ELEMENT IS DELETED SINCE THERE IS NO define
      ELEMENT AS REFERENCE DESTINATION OF ref ELEMENT
      <element name="name">
        <data type="string"/>
      </element>
      <element name="address">
        <data type="string"/>
      </element>
      <ref name="phone">
    </element>
  </define>
  <define name="phone">
    <element name="phone">
      <data type="string"/>
    </element>
  </define>
  define ELEMENT OF birthday ATTRIBUTE IS DELETED
</grammar>
```

F I G. 26

```
SCHEMA OF ver0.3
<grammar xmlns="http://relaxng.org/ns/structure/1.0"
  datatypeLibrary="http://www.w3.org/2001/XMLSchema-datatypes">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
      </attribute>
      <ref name="birthday"/>
      <element name="name">
        <data type="string"/>
      </element>
      <element name="address">
        <data type="string"/>
      </element>
      <ref name="phone"/>
    </element>
  </define>
  <define name="phone">
    <element name="phone">
      <data type="string"/>
    </element>
  </define>
  <define name="birthday">
    <attribute name="birthday">
      <data type="date"/>
    </attribute>
  </define>
</grammar>
```

FIG. 29

DIFFERENCE INFORMATION

| VERSION NUMBER | UPDATED LOCATION | UPDATE TYPE | UPDATED CONTENT |
|---|---|---|---|
| 0.2 | /book/person | add | `<element name="phone"> <data type="string"/> </element>` |
| 0.2 | /book/person@id | retype | unsignedInt |
| 0.3 | /book/person@id | delete | |
| 0.3 | /book/person/phone | rename | PHONE |

FIG. 30

```
<grammar xmlns="http://relaxng.org/ns/structure/1.0"
 datatypeLibrary="http://www.w3.org/2001/XMLSchema-datatypes"
 xmlns:ver="http://versioning.org" ver:num="0.1">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
      </attribute>
      <element name="name">
        <data type="string"/>
      </element>
      <element name="address">
        <data type="string"/>
      </element>
      <element name="phone" ver:add="0.2">   ⎫
        <data type="string"/>                ⎬ SCHEMA OF phone
      </element>                             ⎭ ELEMENT ADDED IN ver0.2
    </element>
  </define>
</grammar>
```

FIG. 31

```
<grammar xmlns="http://relaxng.org/ns/structure/1.0"
  datatypeLibrary="http://www.w3.org/2001/XMLSchema-datatypes"
  xmlns:ver="http://versioning.org" ver:num="0.1">
  <start>
    <element name="book">
      <oneOrMore>
        <ref name="person"/>
      </oneOrMore>
    </element>
  </start>
  <define name="person">
    <element name="person">
      <attribute name="id">
        <data type="unsignedByte"/>
          <ver:reType num="0.2">unsignedInt</ver:reType>   ← CHANGE DATA TYPE OF "id" ATTRIBUTE IN ver0.2
        </data>
      </attribute>
      <element name="name">
        <data type="string"/>
      </element>
      <element name="address">
        <data type="string"/>
      </element>
      <element name="phone" ver:add="0.2">
        <data type="string"/>
      </element>
    </element>
  </define>
</grammar>
```

FIG. 32

```
<grammar xmlns="http://relaxng.org/ns/structure/1.0"
  datatypeLibrary="http://www.w3.org/2001/XMLSchema-datatypes"
  xmlns:ver="http://versioning.org" ver:num="0.1">
  <start>
    <element name="book">
      <oneOrMore>
        <ref name="person"/>
      </oneOrMore>
    </element>
  </start>
  <define name="person">
    <element name="person">
      <attribute name="id">
        <attribute name="id" ver:delete="0.3">    ⎫
          <data type="unsignedByte"/>             ⎪  "id"
            <ver:reType num="0.2">unsugnedInt</ver:reType>  ⎬  ATTRIBUTE
          </data>                                 ⎪  DELETED
        </attribute>                              ⎭  IN ver0.3
      </attribute>
      <element name="name">
        <data type="string"/>
      </element>
      <element name="address">
        <data type="string"/>
      </element>
      <element name="person" ver:add="0.2">
        <data type="string"/>
      </element>
    </element>
  </define>
</grammar>
```

INFORMATION PROCESSING APPARATUS AND CONTROL METHOD THEREOF, AND DOCUMENT VERIFICATION APPARATUS AND CONTROL METHOD THEREOF

BACKGROUND OF THE INVENTION

1. Field of the Invention

The present invention relates to a validation check technique of a structured document.

2. Description of the Related Art

CVS (Concurrent Versions System) (http://www.cvshome.org/) is known as a tool for managing the versions of document files and source codes of programs. CVS parses data to be added to or deleted from a file of the previous version for respective lines, and adds difference information from the previous version to a version-managed file. When the user wants to acquire data of a certain version number, he or she designates that version number in a CVS server. Then, the CVS server parses version-managed files to extract data according to that version number. With this operation, the user can acquire a file of the designated version. The version designation method is not limited to a version number, but the version can also be designated by an edit date of that file. Even when one file is edited by a plurality of users, that file can undergo version management. Such management is used in collaborative edit processing of a document file using personal computers (PCs) which can communicate with each other via a network.

In recent years, as a data format that structurally describes data by appending tags, structured documents have attracted attention. As the typical standards of structured documents, XML (extensible Markup Language) and XHTML (extensible HyperText Markup Language) are known. When an application parses data of a tagged structured document, it generally uses an XML parser to parse the document.

As a technique for managing the versions of such structured document, Japanese Patent Laid-Open No. 7-200370 discloses a technique that manages the edited times of respective elements by appending attributes each of which includes an edit time of each edited element as a value.

Also, a schema processor which verifies, using a schema that defines the data structure, element contents, and data types of attribute values of a structured document, if the structured document satisfies that scheme is available. An application that needs to verify structured documents to be handled using a schema creates a new schema file along with upgrading of the version of the application. For this reason, when the data structure or data types of a structured document to be handled are changed, that application creates a new schema file to check validation of the upgraded structured document.

However, for example, when an application which has been repetitively upgraded handles data generated by an application of an older version, it needs to verify the data using a schema file according to the version. That is, in order to implement validation checking using a conventional schema processor, schema files corresponding to structured documents used in the respective versions of the application are required to be held.

For example, a structured document that describes an address book will be explained. A structured document of ver0.1 shown in FIG. 1 describes data of ID numbers assigned to persons, names, and addresses. A schema of the address book of ver0.1 in this case is expressed, as shown in FIG. 2. Note that this schema is described using RELAX NG as a schema language formulated by International Organization for Standardization (ISO).

Assume that in a structured document of ver0.2, a "phone" element corresponding to a telephone number is added to ver0.1. In this case, a structured document is expressed, as shown in FIG. 3, and its schema is expressed, as shown in FIG. 4. That is, although an added element is only a telephone number ("phone" element), two schema files (schema data) of ver0.1 and ver0.2 including redundant data need to be saved in a hard disk.

SUMMARY OF THE INVENTION

According to one aspect of the present invention, an information processing apparatus, which generates schema data that defines a structure including elements and attributes described in structured document data, comprises: input unit for inputting schema data of a first version, and schema data of a second version newer than the first version; detection unit for detecting an element of a part different between the schema data of the first version and the schema data of the second version, and a difference type; and generation unit for generating single schema data by adding the detected element and the difference type to the schema data of the first version together with information indicating the second version.

According to another aspect of the present invention, a method of controlling an information processing apparatus, which generates schema data that defines a structure including elements and attributes described in structured document data, comprises: an input step of inputting schema data of a first version, and schema data of a second version newer than the first version; a detection step of detecting an element of a part different between the schema data of the first version and the schema data of the second version, and a difference type; and a generation step of generating single schema data by adding the detected element and the difference type to the schema data of the first version together with information indicating the second version.

According to the present invention, a technique that can efficiently check the validation of a structured document using schema data corresponding to structured documents of different versions can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is an exemplary view of a structured document of ver0.1;

FIG. 2 is a view showing a schema for the structured document of ver0.1;

FIG. 3 is an exemplary view of a structured document of ver0.2;

FIG. 4 is a view showing a schema for the structured document of ver0.2;

FIG. 7 is a view showing a schema corresponding to a structured document of ver0.1;

FIG. 8 is a view showing a schema corresponding to a structured document of ver0.2 to which an element is added;

FIG. 9 is a view showing a schema corresponding to a structured document of ver0.2 in which an attribute is deleted;

FIG. 10 is a view showing a schema corresponding to a structured document of ver0.2 in which an element name is changed;

FIG. 11 is a view showing a schema corresponding to a structured document of ver0.2 in which a data type of an attribute is changed;

FIG. 12 is an exemplary view showing single schema data that manages a plurality of versions;

FIG. 15 is a view showing a structured document of ver0.2 including version information;

FIG. 23 is an exemplary view showing an upgraded schema;

FIG. 24 is a view showing a schema of ver0.1;

FIG. 25 is a view showing a schema of ver0.2;

FIG. 26 is a view showing a schema of ver0.3;

FIG. 29 is a view showing externally provided difference information file;

FIG. 30 is a view showing an example of schema, which shows the creation process of schema that manages a plurality of versions based on externally provided difference information;

FIG. 31 is a view showing another example of schema, which shows the creation process of schema that manages a plurality of versions based on externally provided difference information; and FIG. 32 is a view showing still another example of schema, which shows the creation process of schema that manages a plurality of versions based on externally provided difference information.

DESCRIPTION OF THE EMBODIMENTS

Preferred embodiments of the present invention will be described in detail hereinafter with reference to the accompanying drawings. Note that the following embodiments are presented for the exemplary purpose only, and do not limit the scope of the present invention.

First Embodiment

An implementation example of information processing (schema generation) and document verification processing of the present invention using a general information processing apparatus (PC) will be explained below. Note that in the following description, the information processing apparatus implements both the aforementioned schema generation function and document verification function by executing an application.

<Apparatus Arrangement>

Figure 5:
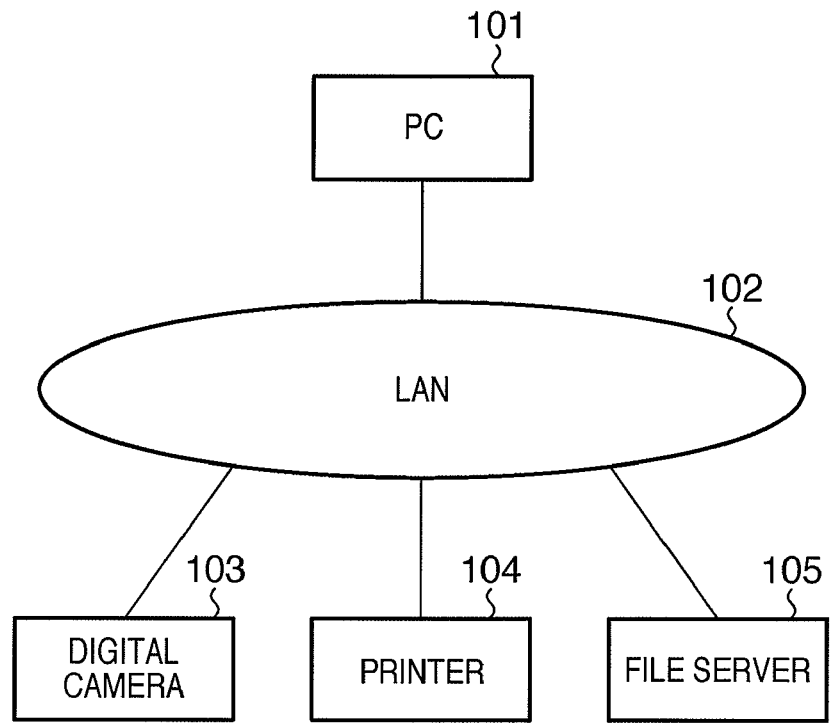
FIG. 5 is a diagram showing the arrangement of a system including an information processing apparatus (PC) according to the first embodiment.

FIG. 5 is a diagram showing the arrangement of a system including an information processing apparatus (PC) according to the first embodiment. A PC 101 is connected to a LAN 102. To the LAN 102, a digital camera 103, printer 104, and file server 105 are connected. The PC 101 manages various data generated by or stored in the digital camera 103, printer 104, and file server 105. For example, assume that the PC 101 manages document data stored in the file server 105.

Figure 6:
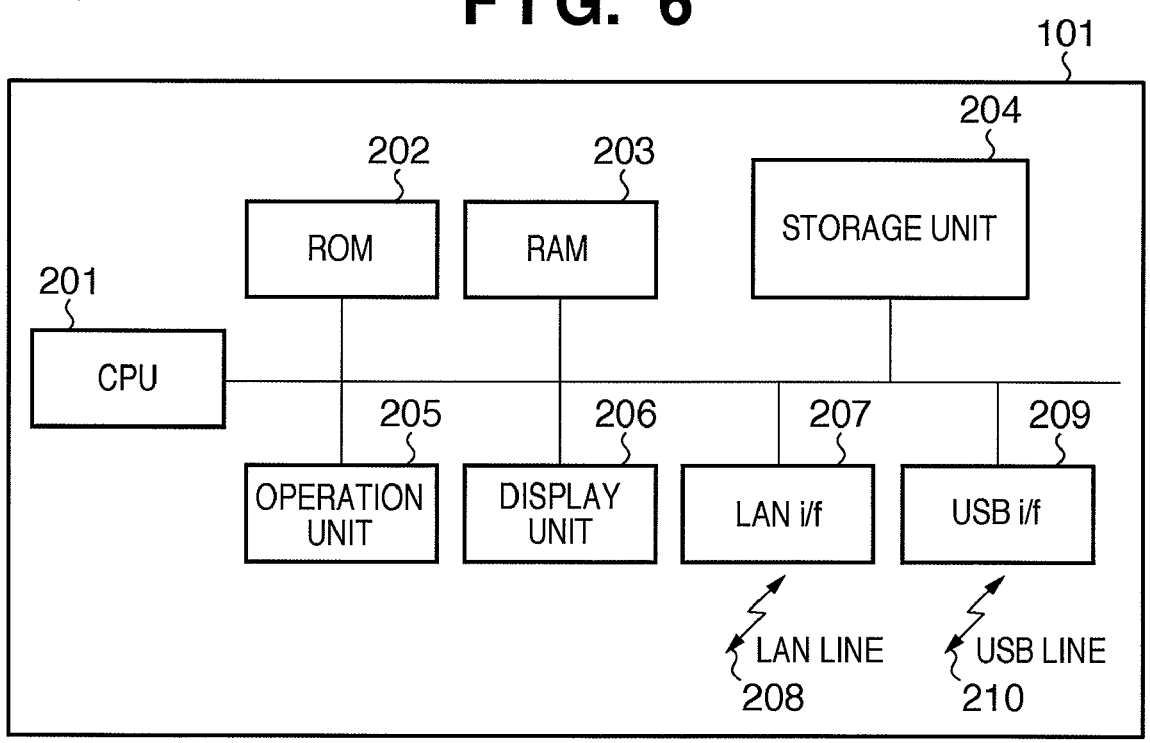
FIG. 6 is a block diagram showing the internal arrangement of the information processing apparatus (PC) according to the first embodiment.

FIG. 6 is a block diagram showing the internal arrangement of the information processing apparatus (PC) according to the first embodiment.

A CPU 201 is a system control unit, which controls the overall apparatus by executing various programs. A ROM 202 stores control programs to be executed by the CPU 201, and various permanent data. A RAM 203 comprises an SRAM, DRAM, or the like, and temporarily stores program control variables and the like. The RAM 203 also stores various setting parameters and various work buffers.

A storage unit 204 is a large-capacity storage device used to store various data files such as document data, image data, and the like. For example, the storage unit 204 comprises a hard disk drive (HDD) or the like. An operation unit 205 comprises an input device such as a keyboard and mouse, touch panel, and the like, and is used by the operator to make various input operations. A display unit 206 is a functional unit used to inform the operator of various kinds of information by displaying images.

A LAN i/f 207 is an interface used to connect a LAN line 208 (LAN 102) A USB i/f 209 is an interface used to connect a USB line 210.

<Structured Document>

The structure of schema data of structured document data to be handled by the information processing apparatus (PC) according to the first embodiment will be described below. In particular, generation of schema data when a structured document is upgraded, and its data structure or data type is changed will be explained.

Note that RELAX NG (http://www.relaxng.org/spec-20011203.html) formulated by ISO is used as a schema language in the first embodiment. A name space of RELAX NG is "http://relaxng.org/ns/structure/1.0" for version management.

Let verNum be a version number of a structured document after the user's edit operation. In the following description, the first version of verNum is 0.1, and the version number increases in increments of 0.1. That is, the version number is incremented like 0.1→0.2→0.3.

FIG. 7 is a view showing schema data corresponding to structured document data (address book) of ver0.1. Note that structured document data for this schema data is address book data of ver0.1 shown in FIG. 1.

The first embodiment uses the schema data shown in FIG. 7 as reference schema data. When the user adds a new element or attribute to a structured document, he or she adds a "ver: add" attribute including "verNum" as a value to the added element or attribute. Assume that a prefix "ver" is stated by "xmlns:ver=http://versioning.org", and is associated with the name space "http://versioning.org".

Then, assume that a "phone" element that represents a telephone number is added as a child element of each "person" element in ver0.2, as shown in FIG. 3.

FIG. 8 is a view showing schema data corresponding to structured document data (address book) of ver0.2 to which an element is added. To the schema data shown in FIG. 7, difference information ("phone" element) from ver0.1 (first version) to ver0.2 (second version) is added. In the added "phone" element, a "ver:add" attribute having "0.2" as a value is added. That is, an element ("phone" element in this case) of a different part and a difference type ("add" in this case) are detected and added.

On the other hand, assume that an "id" attribute in each "person" element is deleted in ver0.2. Upon deleting an element or attribute from a structured document, a "ver:delete" attribute including "verNum" as a value is added to a schema of the element or attribute to be deleted.

FIG. 9 is a view showing schema data corresponding to structured document data (address book) of ver0.2 in which an attribute is deleted. In this case, a "ver:delete" attribute having "0.2" as a value is added to an "attribute" element that defines a schema of an "id" element to be deleted in ver0.2.

Assume that the name of a "name" element (element name) in each "person" element is changed in ver0.2. When the name of an element or attribute in a structured document is changed, a "ver:rename" element is added as a child element of a schema that defines the element or attribute, the name of which is to be changed, thus defining the name after change.

FIG. 10 is a view showing schema data corresponding to structured document data (address book) of ver0.2 in which the element name is changed. FIG. 10 shows an example in which the element name of a "name" element is changed to "NAME". More specifically, a "ver:rename" element is added as a child element of the "name" element which defines a schema of the "name" element. Then, a "num" attribute having the version number "0.2" as a value is described as an attribute, and "NAME" as an element name (i.e., the element name after change) of ver0.2 is described as its element content.

Furthermore, assume that the data type of an "id" attribute in each "person" element is changed in ver0.2. In order to change an attribute of an element in a structured document, a "ver:reType" element is added as a child element of a schema of the data type to be changed, thereby defining a data type after change.

FIG. 11 is a view showing schema data corresponding to structured document data (address book) of ver0.2 in which the data type of an attribute is changed. FIG. 11 shows a case in which the data type of the "id" element is changed to "unsignedInt". More specifically, a "ver:reType" element having a "num" attribute including "0.2" as a value is added as a child element of a "data" element, and "unsignedInt" as a new data type is described as its data content.

As described above, when the data structure or data type is changed by version upgrading, difference information and its version number are described (additionally written) in the reference schema data (ver0.1 in this case). In this embodiment, two types of versions have been explained. However, by recursively executing the aforementioned processes in ascending order, N types (N is a positive integer equal to or larger than 3) of versions can be coped with. That is, by sequentially processing from schema data of the first version to that of the latest version, single schema data is generated from N schema data corresponding to respective versions.

<Operation of Apparatus>

The sequence for verifying a structured document using schema data generated as described above will be described below. Note that the first embodiment will explain a method in which a DOM tree of a whole schema is generated first using a DOM parser, and nodes which are not required for verification are deleted based on the version number designated from an application.

FIG. 12 is an exemplary view showing schema data which manages a plurality of versions. More specifically, FIG. 12 shows schema data which manages three versions "0.1", "0.2", and "0.3".

FIG. 15 is an exemplary view showing structured document data. Note that the structured document data includes version information in advance, as shown in FIG. 15. More specifically, in a "book" element of a root, a prefix "ver" is stated by "xmlns:ver=http://versioning.org", and a "ver:num" attribute describes that the version number of this structured document is "0.2".

Figure 13:
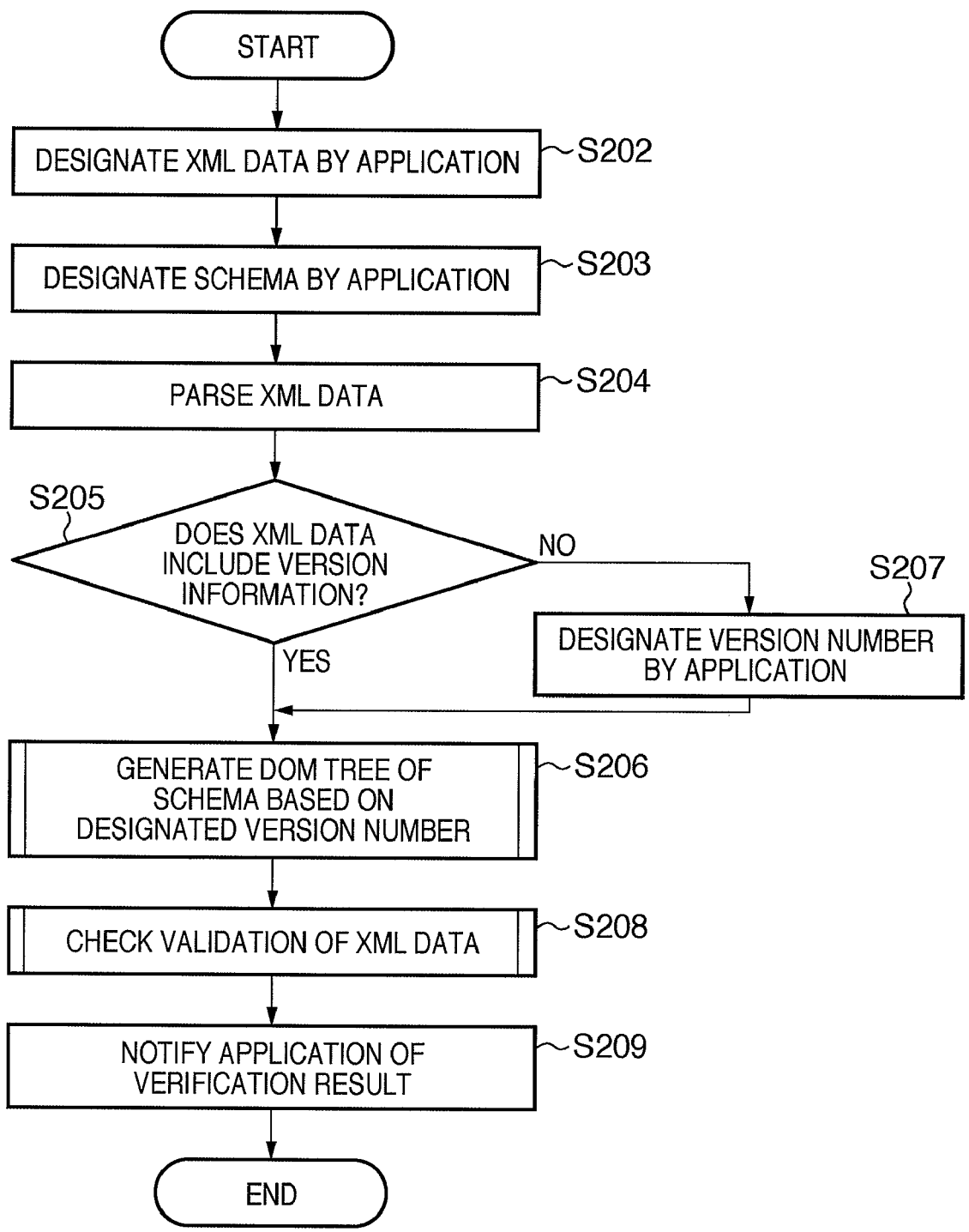
FIG. 13 is a flowchart showing the sequence for executing validation checking of a structured document.

FIG. 13 is a flowchart showing the sequence for executing validation checking of structured document data. Note that the following steps are implemented when the CPU 201 of the PC 101 executes a structured document verification application.

In step S201, execution of the structured document verification application is started. More specifically, this step is implemented when the PC 101 accepts an execution instruction of the structured document verification application from the user via the operation unit 205.

In step S202, the application designates a structured document which is to undergo validation checking in a schema processor. Note that the schema processor may be configured to be embedded in the application or as an external program called from the application.

In step S203, schema data used in validation checking is designated. That is, designation of the aforementioned schema data including a plurality of pieces of version information is accepted via, for example, a user's operation.

In step S204, the schema processor parses the structured document data.

It is checked (determined) in step S205 based on the parsing result in step S204 if the structured document data includes version information (version determination unit). That is, it is checked if the structured document data includes the version information shown in FIG. 15. If it is determined that the structured document data does not include any version information, the process advances to step S207; otherwise, the process advances to step S206.

In step S207, the application designates a version number in the schema processor. For example, the application accepts user's designation of a version number via the operation unit 205.

In step S206, a DOM (Document Object Model) tree of a schema corresponding to the structured document data is generated based on the version number designated in step S205 or S207. That is, a DOM tree is generated from the schema data designated in step S203. The generated DOM tree is stored in the RAM 203. Note that details of the generation processing of a DOM tree will be described later with reference to FIG. 14.

In step S208, validation of the structured document designated in step S202 is checked based on the DOM tree generated in step S206. Note that details of the validation check processing will be described later with reference to FIG. 19.

In step S209, the schema processor notifies the application of the validation check result in step 3208, thus ending the processing (step S210).

Figure 14:
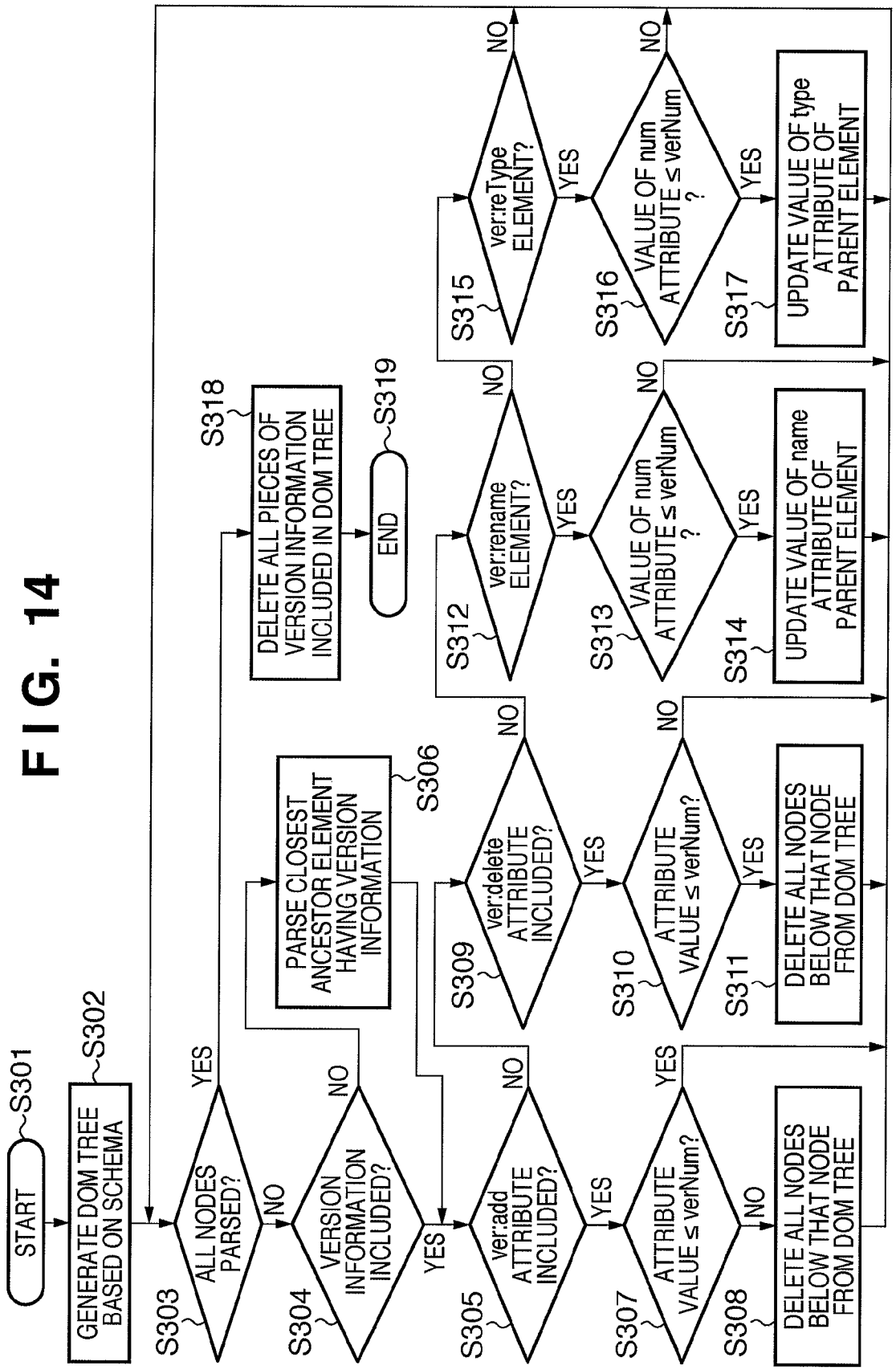
FIG. 14 is a detailed flowchart of DOM tree generation.

FIG. 14 is a detailed flowchart of DOM tree generation corresponding to step S206.

In step S301, execution of the schema processor is started. As described above, the schema processor is embedded in the application or called from the application.

In step S302, the schema data designated in step S203 is loaded and stored in the RAM 203. That is, DOM tree is generated based on the schema data shown in FIG. 12, and is saved in an internal memory.

It is checked in step S303 if all element nodes have been parsed. If it is determined that not all element have been parsed yet, one of element nodes to be parsed is selected, and the process advances to step S304; otherwise, the process advances to step S318.

It is checked in step S304 if the selected element node includes version information. If it is determined that the element node includes version information, that version number is set, and the process then advances to step S305; otherwise, the process advances to step S306.

It is checked in step S305 if the element node includes a "ver:add" attribute. Assume that the prefix "ver" is stated by "xmlns:ver=http://versioning.org" as that indicating the name space used to execute version management. If it is determined that the element node does not include any "ver:add" attribute, the process advances to step S309. On the other hand, if it is determined that the element node includes a "ver:add" attribute, it is checked if its attribute value is a value equal to or smaller than the version number "verNum" which is designated in the schema processor by the application (step S307). If it is determined that the attribute value is not a value equal to or smaller than "verNum", nodes below that element node are deleted from the DON tree (step S308), and the process returns to step S303. On the other hand, if it is determined that the attribute value is a value equal to or smaller than "verNum", data associated with that element node is not updated, and the process returns to step S303.

It is checked in step S309 if the element node includes a "ver:delete" attribute. If it is determined that the element node does not include any "ver:delete" attribute, the process advances to step S312. On the other hand, if it is determined that the element node includes a "ver:delete" attribute, it is checked if its attribute value is a value equal to or smaller than the version number "verNum" (step S310). If it is determined that the attribute value is a value equal to or smaller than the version number "verNum", nodes below that element node are deleted from the DON tree (step S311), and the process then returns to step S303. On the other hand, if it is determined that the attribute value is not a value equal to or smaller than the version number "verNum", data associated with that element node is not updated, and the process returns to step S303.

It is checked in step S312 if the element node is a "ver:rename" element. If it is determined that the element node is not a "ver:rename" element, the process advances to step S315. On the other hand, if it is determined that the element node is a "ver:rename" element, it is checked if the value of an attribute "num" of the "ver:rename" element is equal to or smaller than the version number "verNum" (step S313). If it is determined that the value of the attribute "num" is equal to or smaller than the version number "verNum", a value of a "name" element included in a parent "element" element is updated by the element content of the "ver:rename" element (step S314), and the process then returns to step S303. On the other hand, if it is determined that the value of the attribute "num" is not equal to or smaller than the version number "verNum", the value of the "name" attribute included in the parent "element" element is not updated, and the process returns to step S303.

It is checked in step S315 if the element node is a "ver:reType" element. If it is determined that the element node is not a "ver:reType" element, the process returns to step S303. If it is determined that the element node is a "ver:reType" element, it is checked if the value of an attribute "num" of the "ver:reType" element is equal to or smaller than the version number "verNum" (step S316). If it is determined that the value of the attribute "num" is equal to or smaller than the version number "verNum", the value of a "type" attribute included in a parent "data" element is updated by the element content of the "ver:reType" element (step S317), and the process then returns to step S303. On the other hand, if it is determined that the value of the attribute "num" of the "ver:reType" element is not equal to or smaller than the version number "verNum", the value of the "type" attribute included in the parent "data" element is not updated, and the process returns to step S303.

If it is determined in step S304 that the selected element node does not include any version information, version information of a closest ancestor element having version information is set (step S306). After that, the aforementioned processes in step 3305 and subsequent steps are executed.

For example, in the schema data shown in FIG. 12, as for a schema <element name="person"> of a "person" element, a closest ancestor element including version information is a "grammar" element. For this reason, the processes in step S305 and subsequent steps are executed using an attribute "ver:num" of that "grammar" element. Since NO is determined for all "verNum"s in steps S305, S309, S312, and S315, data of the schema of the "person" element are not updated.

Likewise, as for a "data" element as a child element of a schema of an "id" attribute, the processes in step S305 and subsequent steps are executed using an attribute "ver:delete" of a parent "attribute" element.

If "verNum" is 0.1 or 0.2, steps S309 and S310 are processed. At this time, since an attribute value "0.3" is not equal to or smaller than "verNum", a schema of a "data" element is not updated in verification of ver0.1 and ver0.2. If "verNum" is 0.3, steps S309 and S310 are processed in processing of a parent "attribute" element. At this time, since it is determined that the value of the "ver:delete" attribute is equal to or smaller than "verNum", all nodes below the schema of the "attribute" element are deleted.

As for a "data" element having a "type" attribute with a value "string" in a schema of a "phone" element, the following state is obtained. More specifically, if "verNum" is 0.1, an "element" element that represents the schema of the "phone" element has a "ver:add" attribute with a value "0.2" in step S308 upon processing that element. For this reason, all nodes below the "phone" element are deleted. If "verNum" is 0.2 or 0.3, the "element" element that represents the schema of the "phone" element is not deleted from the DOM tree. For this reason, since the "data" element as its child element uses a "ver:add" attribute of a parent, it is determined in step S307 that the value of the "ver:add" attribute is equal to or smaller than "verNum". That is, the child element "data" is not deleted from the DOM tree.

If it is determined in step S303 that all element nodes have been parsed, all element nodes and attribute nodes which belong to the name space used to execute version management are deleted from the DOM tree (step S318), thus ending the processing (step S319). Hence, after the processing in step S318, elements and attributes other than the name space "http://relaxng.org/ns/structure/1.0" of the schema language used in the description are not included in the DOM tree.

Figure 16:
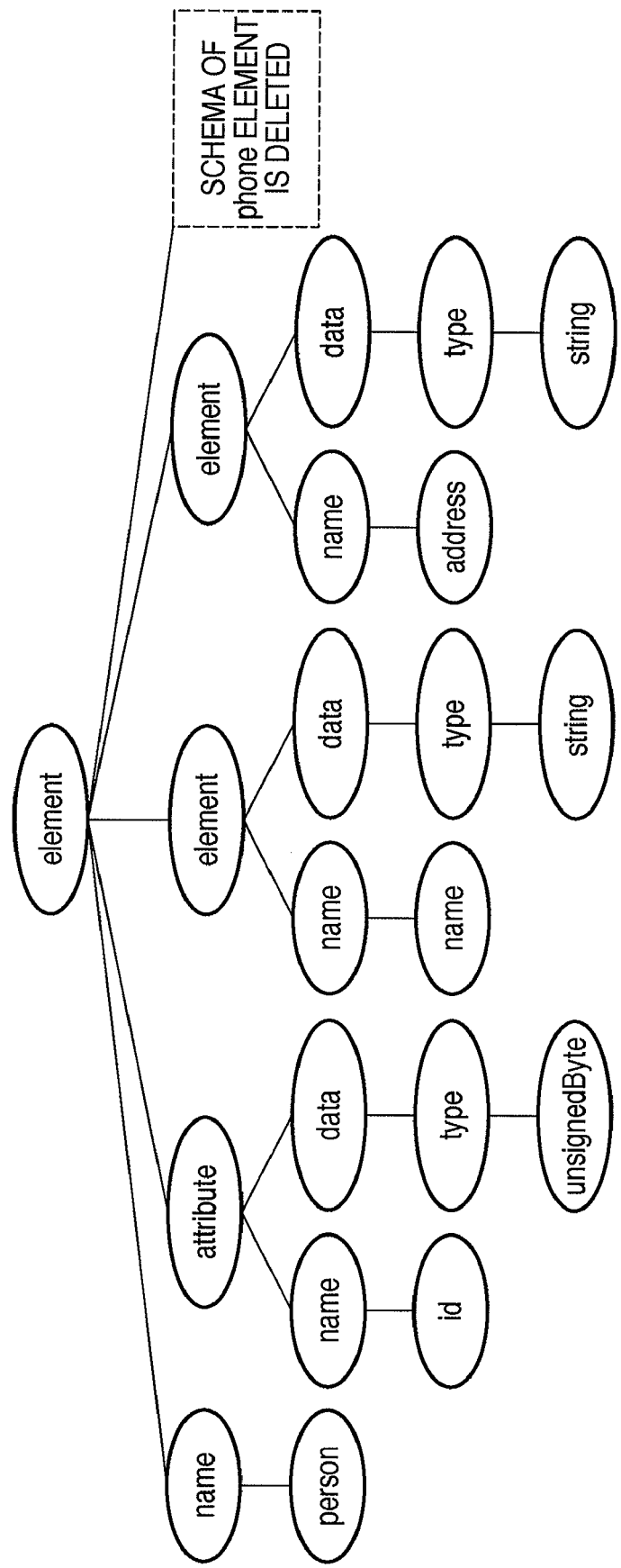
FIG. 16 is a partial view of a DOM tree of ver0.1.
Figure 17:
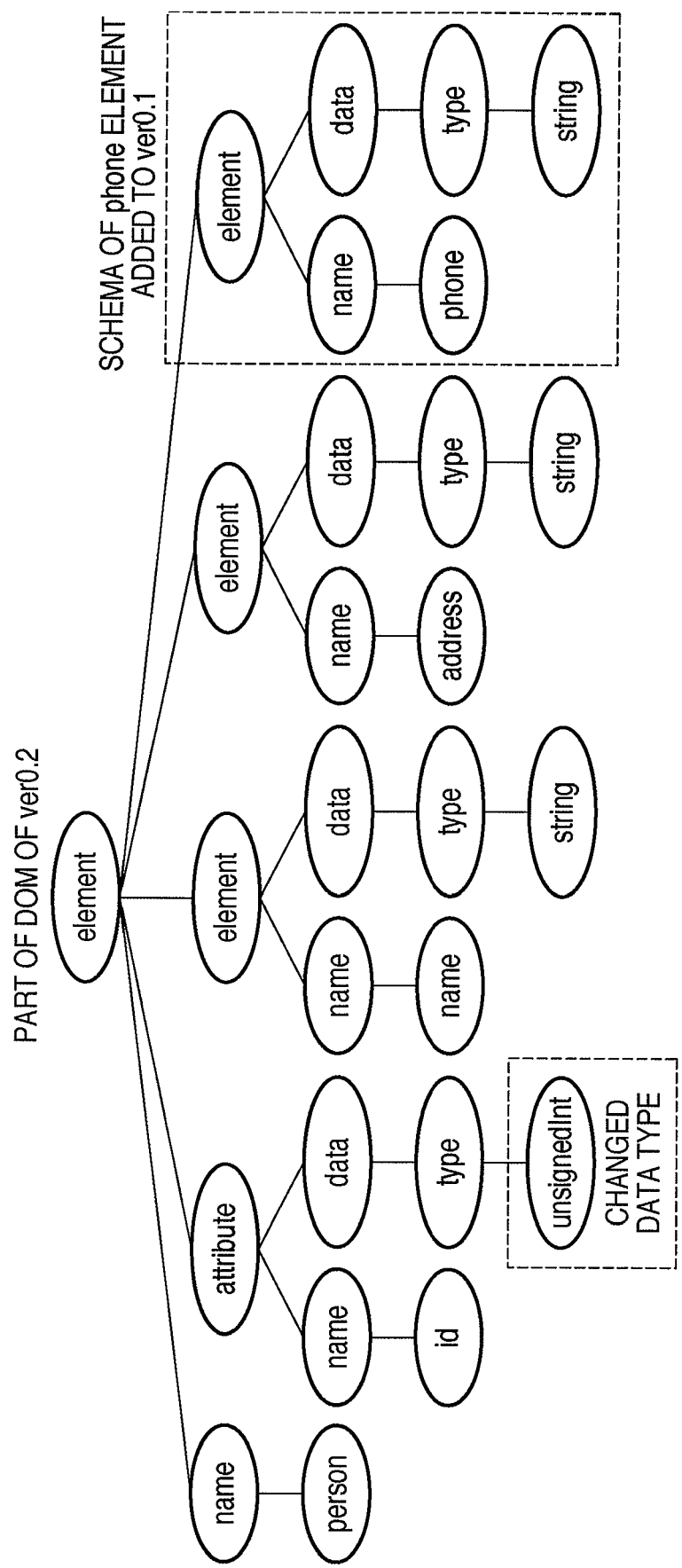
FIG. 17 is a partial view of a DOM tree of ver0.2.
Figure 18:
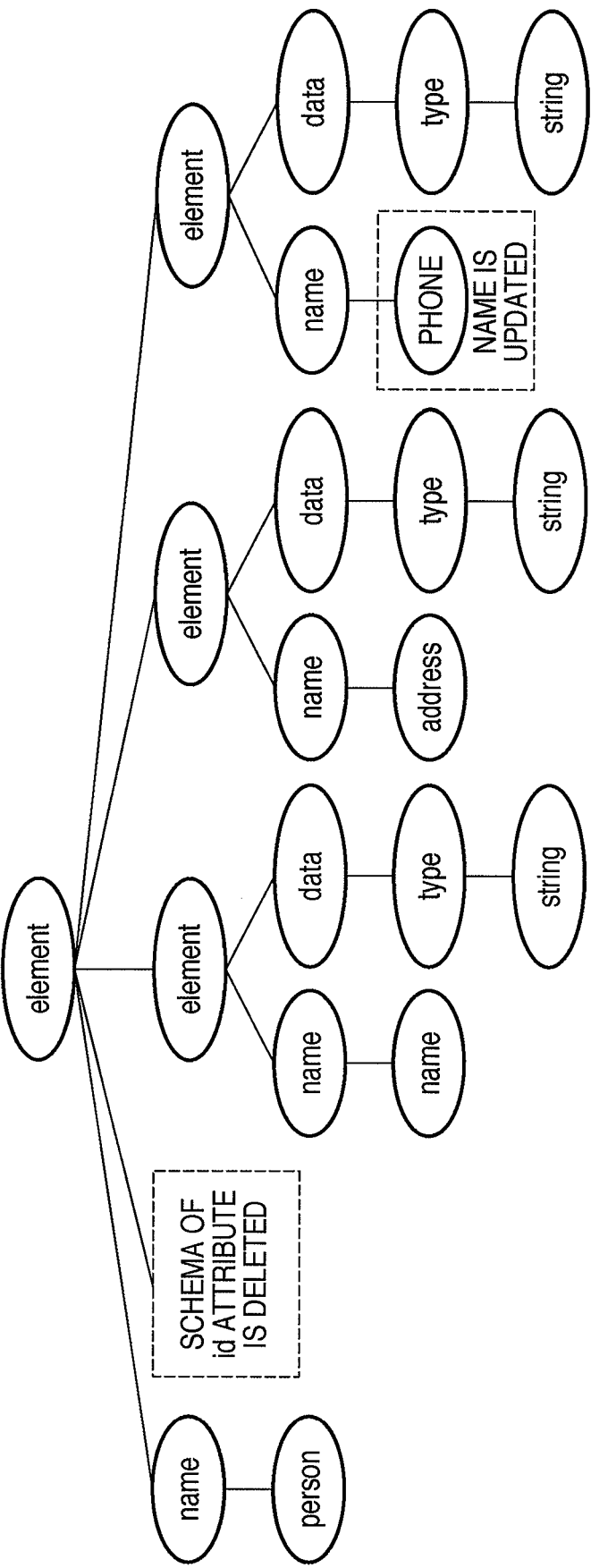
FIG. 18 is a partial view of a DOM tree of ver0.3.

In this manner, when the application designates each of the version numbers "0.1", "0.2", and "0.3", a corresponding DOM tree is generated. That is, the schema processor generates DOM trees shown in FIGS. 16, 17, and 18 for a schema that represents a "person" element, and saves them in the internal memory.

Figure 19:
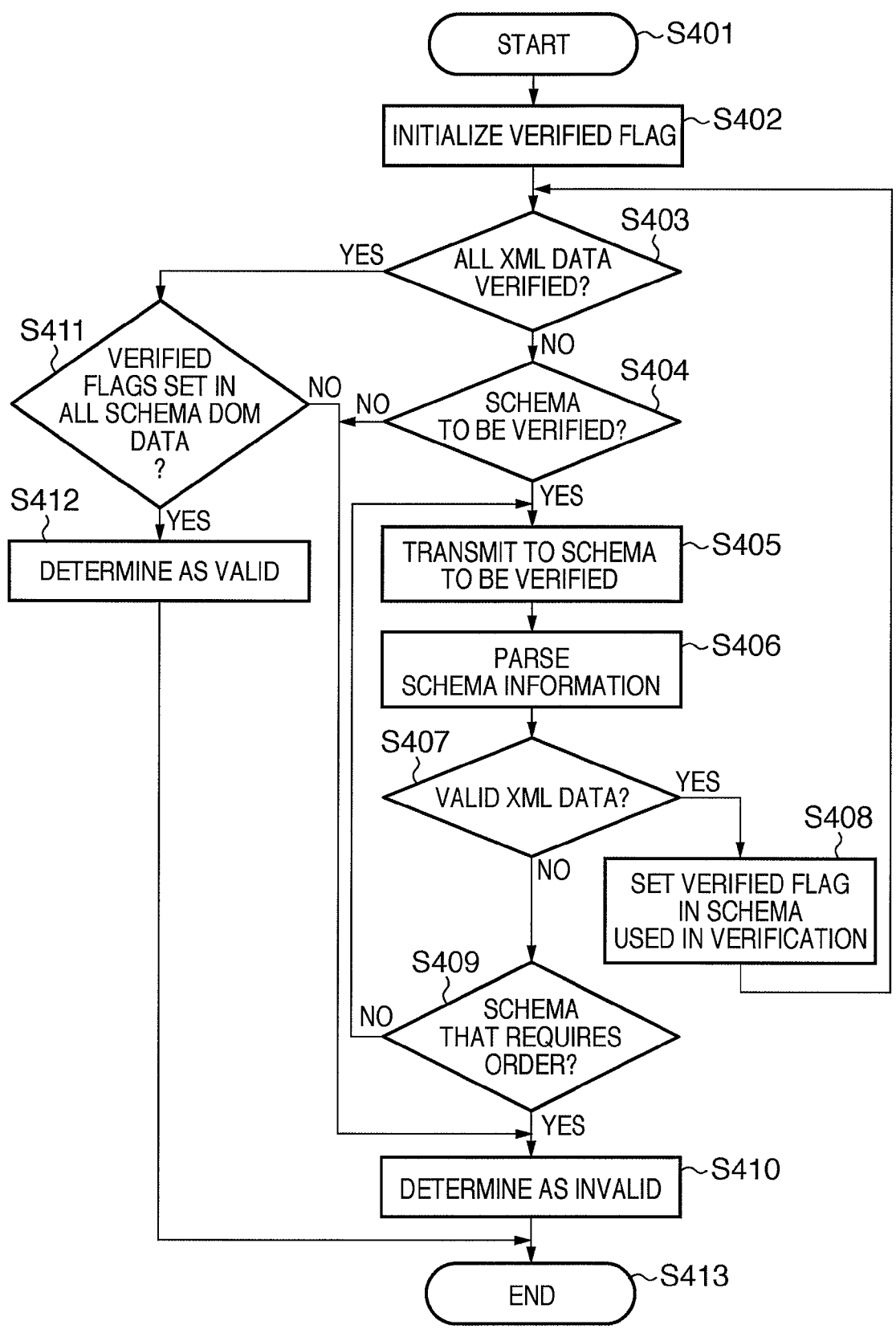
FIG. 19 is a flowchart showing details of the sequence of validation check processing.

FIG. 19 is a flowchart showing, in detail, the sequence of validation check processing in step S208.

In step S402, a flag indicating whether or not a given document has already been verified as a structured document for respective nodes of a DON tree of a schema is initialized to "0". If the document has already been verified as a structured document, the value of this flag is changed to "1". In this case, a SAX (Simple API for XML) parser which parses a structured document in turn in the order of start tags, element contents, and end tags is used. As a result, the schema processor parses a structured document, and executes validation checking of data of the start tags, element contents, and end tags in turn from the first data.

It is checked in step S403 if all data of the structured document have undergone validation checking. If it is determined that not all data of the structured document have undergone validation checking yet, XML data to be verified is selected, and the process advances to step S404. On the other hand, if it is determined that all data have undergone validation checking, the process advances to step S411.

It is checked in step S404 if nodes to be used in verification still remain in a DOM tree of a schema, by parsing the verified flags. If nodes to be used in verification still remain, the process advances to step S405; otherwise, the process jumps to step S410.

In step S405, a target to be verified is transited to a node of a schema to be used in verification.

In step S406, the schema to be verified transited in step S405 is parsed. If that schema is a schema which defines an element, its element name, and pieces of type information of an attribute name and attribute value included in that element are parsed. If that schema is a schema which defines an element content, type information of the element content is parsed.

It is checked in step S407 based on the information parsed in step S406 if XML data to be verified is valid. If it is determined that the XML data is valid, the process advances to step S408; otherwise, the process advances to step S409.

In step S408, a flag "1" indicating that a node has already been used in verification is set in each node of the schema used in verification. After that, the process returns to step S403.

It is checked in step S409 if the schema parsed in step S406 is a schema which requires an order. For example, in schemata (DOM trees) shown in FIGS. 16 to 18, child elements of a "person" element are schemata that require an order. Child elements that do not require an order of the "person" element can be defined by setting an "interleave" element as a parent element. If it is determined that the parsed schema is that which requires an order, the process advances to step S410; otherwise, the process returns to step S405 to transit to a node of a schema to be verified.

It is determined in step S410 that the current XML data which is being verified is invalid, thus ending the processing (step S413). That is, it can be determined that extra data which is not included in information defined by the schema exists.

It is checked in step S411 if the verified flags are set in respective nodes of the DOM tree of the schema. If the flags are set in all nodes, the process advances to step S412; otherwise, the process jumps to step S410.

It is determined in step S412 that the structured document to be verified is valid, thus ending the processing (step S413).

As described above, the information processing apparatus according to the first embodiment can execute version management of schemata within a single file (single schema data). Hence, the number of files and the file size can be prevented from exponentially increasing according to the number of versions.

Based on a version number designated from the application, a DOM tree of a schema for that version can be generated from the aforementioned single schema data. Hence, validation checking specialized to the designated version can be implemented.

In the first embodiment, RELAX NG is used as a schema language, but other schema languages may be used. For example, DTD and XML Schema may be used.

Second Embodiment

The second embodiment will explain a method of generating a DOM tree of a schema used in validation checking using a SAX parser. Note that the SAX parser sequentially parses a structured document while separating it into start tags, end tags, and element contents, and notifies a parsing result. Since the internal arrangement of an information processing apparatus is the same as that of the first embodiment, a repetitive description thereof will be avoided.

<Operation of Apparatus>

Figure 20:
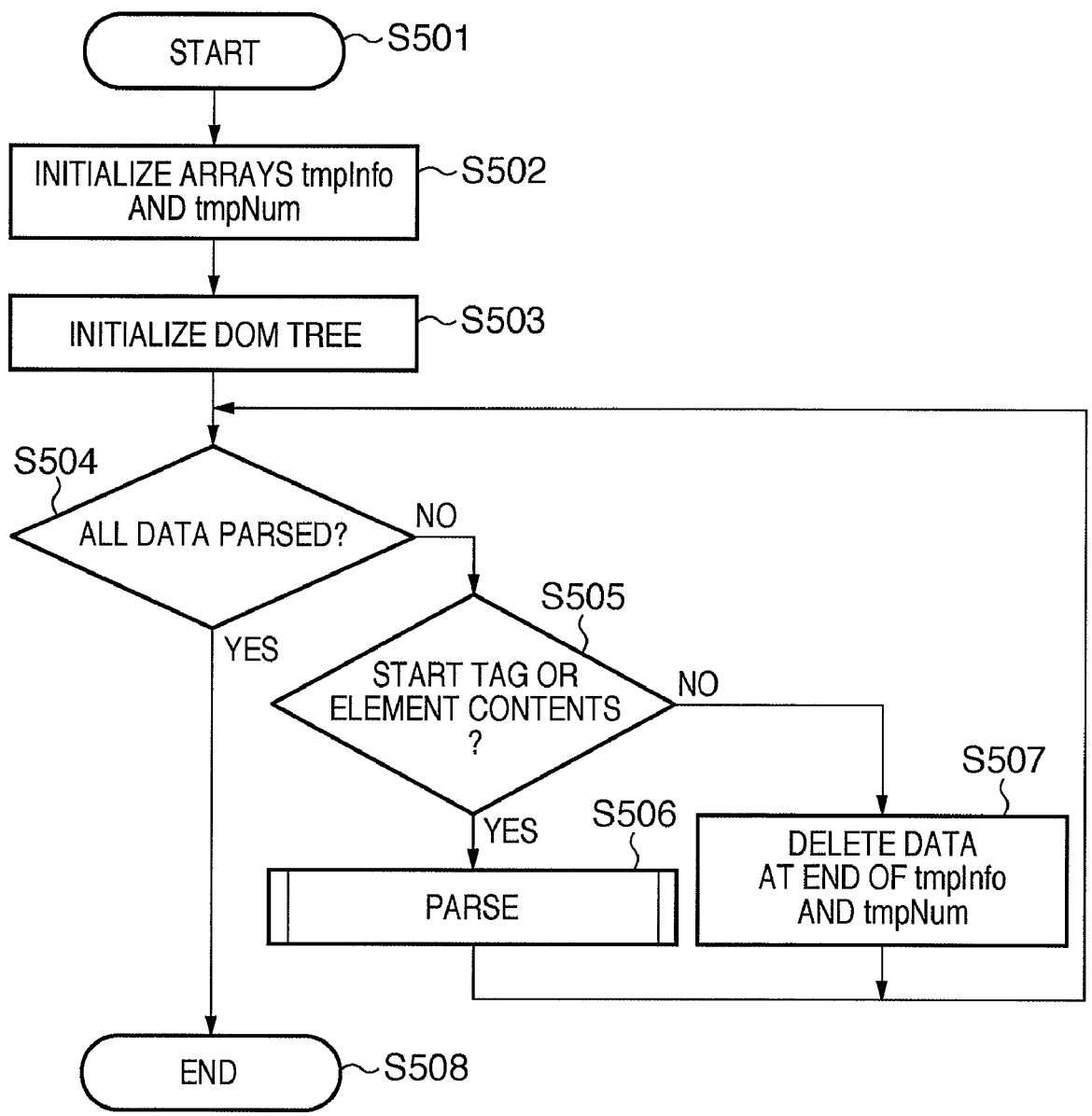
FIG. 20 is an overall flowchart of DOM tree generation according to the second embodiment.

FIG. 20 is an overall flowchart of DOM tree generation according to the second embodiment.

In step S501, execution of a schema processor is started. As described above, the schema processor is embedded in the application or called from the application.

In step S502, an array tmpInfo which stores the type of difference information such as "ver:add", "ver:delete", "ver:rename", "ver:reType", or the like, and an array tmpNum which stores a version number are initialized.

In step S503, a DOM tree of the schema is initialized to have a "Document" node alone. Subsequently, start tags and element contents of schemata required for validation checking are added to the DOM tree initialized in step S503 based on the parsing result of the SAX parser.

It is checked in step S504 if all data of the schema have been parsed. If it is determined that not all data have been parsed yet, the process advances to step S505; otherwise, the processing ends (step S508).

It is checked in step S505 if the parsing result of data by the SAX parser is a start tag or element content. If the parsing result is a start tag or element content, the process advances to processing (step S506) to be described later with reference to FIGS. 21A and 21B. On the other hand, if the parsing result is not a start tag or element content, the process advances to step S507.

In step S507, data at the end of the arrays tmpInfo and tmpNum are deleted, and the process returns to step S504.

After completion of the process in step S508, the DOM tree initialized in step S503 is built as that of the schema required for validation checking specialized to the version number designated in the schema processor. Then, using this DON tree, the validation check processing described with reference to FIG. 13 can be executed.

Figure 21A:
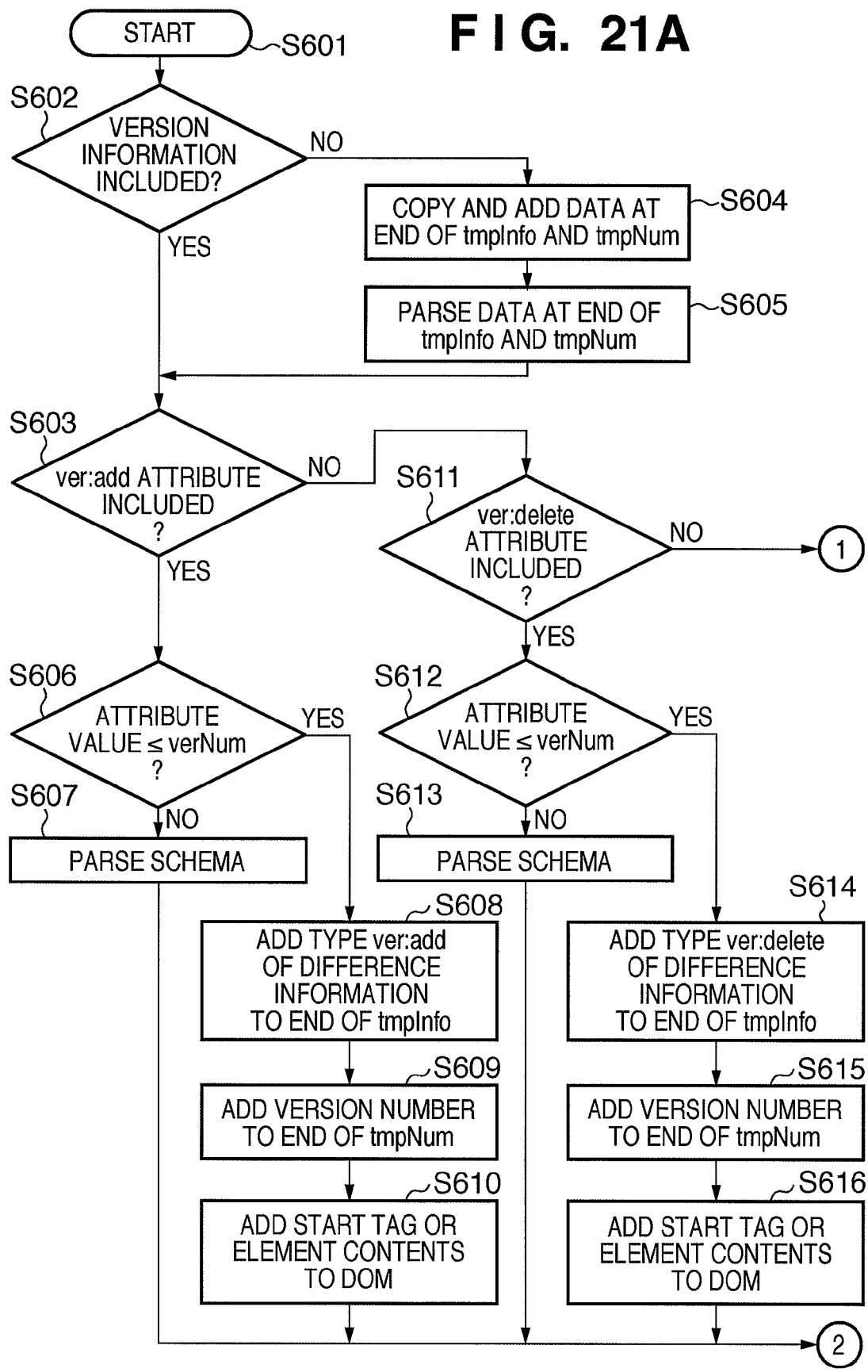
FIG. 21A and 21B are detailed flowchart of partial processing in DOM tree generation.
Figure 21B:
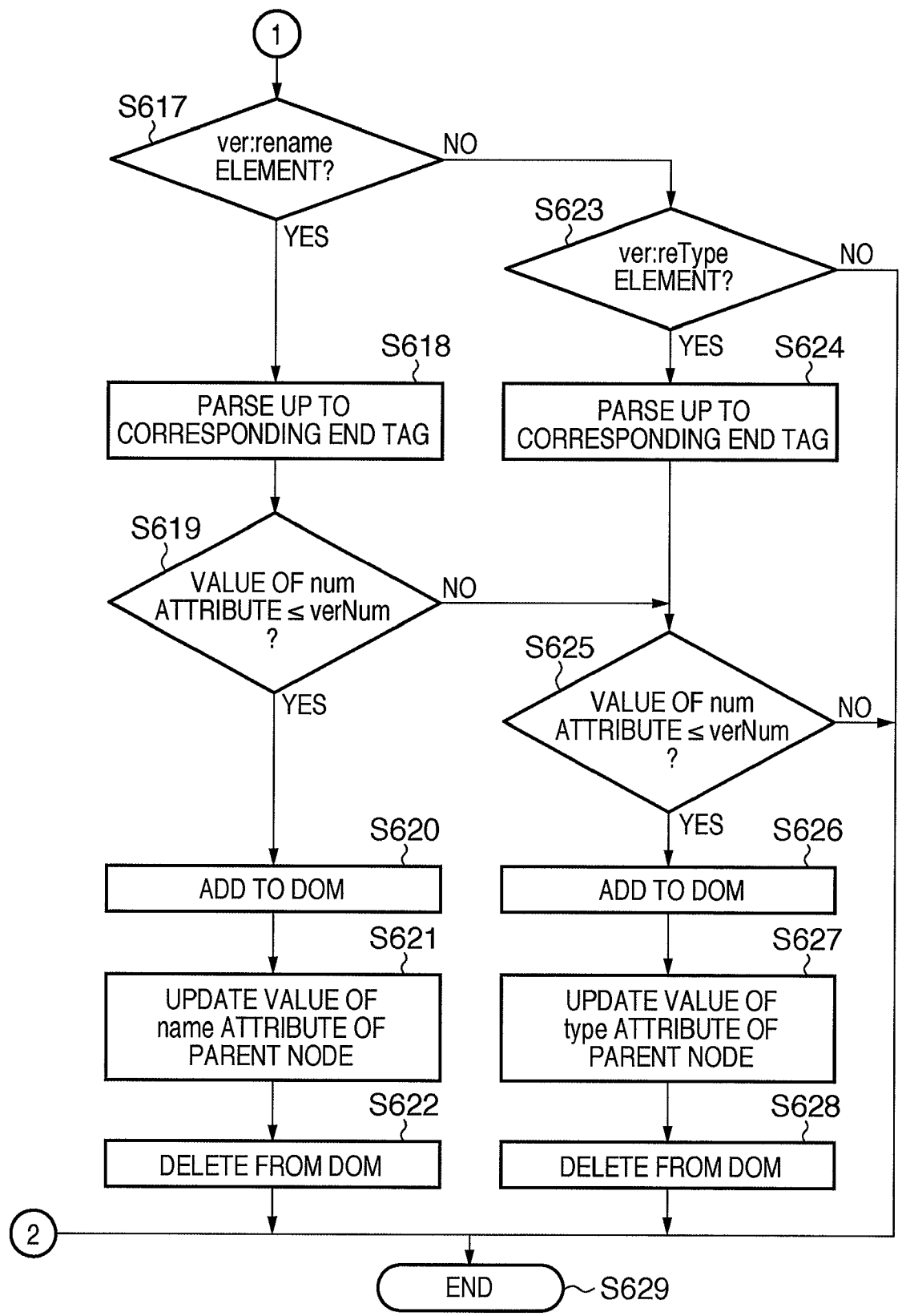

FIGS. 21A and 21B are a flowchart showing details of processing corresponding to step S506 in the DOM tree generation.

It is checked in step S602 if data of the parsing result includes version information. If it is determined that the data includes version information, the process advances to step S603; otherwise, the process advances to step S604.

In step S604, data at the end of the arrays tmpInfo and tmpNum (the type of difference information added in step S608) are respectively copied to an internal memory. Since the data at the end of tmpInfo and tmpNum are deleted in step S507, these copied data are added to the end of the arrays tmpInfo and tmpNum so as to be used as data of the next parsing result.

In step S605, the data copied to the end of the arrays tmpInfo and tmpNum are parsed, and the processes in step S603 and subsequent steps are executed using the parsing result.

It is checked in step S603 if the data includes a "ver:add" attribute. If it is determined that the data does not include any "ver:add" attribute, the process advances to step S611; otherwise, the process advances to step S606.

It is checked in step S606 if the attribute value of "ver:add" is a value equal to or smaller than "verNum". If it is determined that the attribute value of "ver:add" is a value equal to or smaller than "verNum", the type "ver:add" of difference information is added to the end of the array tmpInfo (step S608). Also, the version number as the value of the "ver:add" attribute is added to the end of the array tmpNum (step S609). Furthermore, the start tag or element content which is being parsed is added to the DOM tree of the schema (step S610).

If it is determined in step S606 that the attribute value of "ver:add" is not a value equal to or smaller than "verNum", and it the current data which is being parsed is the start tag, data of the schema are skipped by parsing up to the corresponding end tag. If the current data which is being parsed is the element content, the element content is skipped. That is, no data is added to the DOM tree of the schema (step S607).

It is checked in step S611 if the data includes a "ver:delete" attribute. If it is determined that the data includes a "ver:delete" attribute, the process advances to step S612; otherwise, the process advances to step S617.

It is checked in step S612 if the attribute value of "ver:delete" is a value equal to or smaller than "verNum". If it is determined that the attribute value of "ver:delete" is not a value equal to or smaller than "verNum", the type "ver:delete" of difference information is added to the end of the array tmpInfo (step S614). The version number as the value of the "ver:delete" attribute is added to the end of the array tmpNum (step S615). Furthermore, the start tag or element content which is being parsed is added to the DOM tree of the schema (step S616).

If it is determined in step S612 that the attribute value of "ver:delete" is not a value equal to or smaller than "verNum", and if the current data which is being parsed is the start tag, data of the schema are skipped by parsing up to the corresponding end tag. If the current data which is being parsed is the element content, the element content is skipped. That is, no data is added to the DOM tree of the schema (step S613).

It is checked in step S617 if the data is a "ver:rename" element. If it is determined that the data is a "ver:rename" element, data are parsed up to an end tag corresponding to the "ver:rename" element and are saved in the internal memory (step S618). Then, it is checked if the value of a "num" attribute of the "ver:rename" element saved in the internal memory in step S618 is equal to or smaller than "verNum" (step S619).

If it is determined that the value of the "num" attribute of the "ver:rename" element is equal to or smaller than "verNum", the "ver:rename" element and its element content saved in the internal memory in step S618 are added to the DON tree of the schema (step S620). Then, the value of a "name" attribute of an "element" element of a parent node is updated by the element content of the "ver:rename" element (step S621). Furthermore, the "ver:rename" element and its element content added in step S620 are deleted from the DOM tree of the schema (step S622).

If it is determined in step S619 that the value of the "num" attribute of the "ver:rename" element is not equal to or smaller than "verNum", the "ver:rename" element and its element content saved in the internal memory in step S618 are deleted from the internal memory.

It is checked in step S623 if the data is a "ver:reType" element. If it is determined that the data is a "ver:reType" element, data are parsed up to an end tag corresponding to the "ver:reType" element and are saved in the internal memory (step S624). Then, it is checked if the value of a "num" attribute of the "ver:reType" element saved in the internal memory in step S624 is equal to or smaller than "verNum" (step S625).

If it is determined that the value of the "num" attribute of the "ver:reType" element is equal to or smaller than "verNum", the "ver:reType" element and its element content saved in the internal memory in step S624 are added to the DOM tree of the schema (step S626). Then, the value of a "type" attribute of a "data" element of a parent node is updated by the element content of the "ver:reType" element (step S627). Furthermore, the "ver:reType" element and its element content added in step S626 are deleted from the DON tree of the schema (step S628).

If it is determined in step S625 that the value of the "num" attribute of the "ver:reType" element is not equal to or smaller than "verNum", the "ver:retype" element and its element content saved in the internal memory in step S624 are deleted from the internal memory.

As described in detail above, based on a version number designated from the application, the information processing apparatus according to the second embodiment can generate a DOM tree of a schema for that version from the single schema data. That is, the DOM tree of the schema specialized to the designated version number is built according to the sequence described with reference to FIG. 20.

For this reason, based on the built DON tree, the validation check processing that has been described in the first embodiment with reference to FIG. 13 can be executed.

Third Embodiment

The third embodiment will explain a method of generation a DOM tree of a schema used in validation checking using the schema to which an element or attribute is only added upon upgrading the version. Since the internal arrangement of an information processing apparatus is the same as that of the first embodiment, a repetitive description thereof will be avoided.

<Configuration of Schema>

Assume that a schema that represents difference information of an element or attribute to be added upon upgrading the version is globally defined using a "define" element of RELAX NG. Also, assume that the "define" element includes a "ver:add" attribute including the version number upon addition as a value. Note that a schema which is defined from the first version does not include any "ver:add" attribute.

FIG. 23 is an exemplary view showing a schema obtained by upgrading the version of the schema of the address book of ver0.1 shown in FIG. 7. More specifically, a "phone" element is added as a child element of a "person" element in ver0.2 to the schema of ver0.1 (FIG. 7). Furthermore, in ver0.3, a "birthday" attribute is added as an attribute of the "person"

element to ver0.2. Upon upgrading the versions, the schemata of the "phone" element and "birthday" attribute are added using "define" elements.

<Operation of Apparatus>

Figure 22:
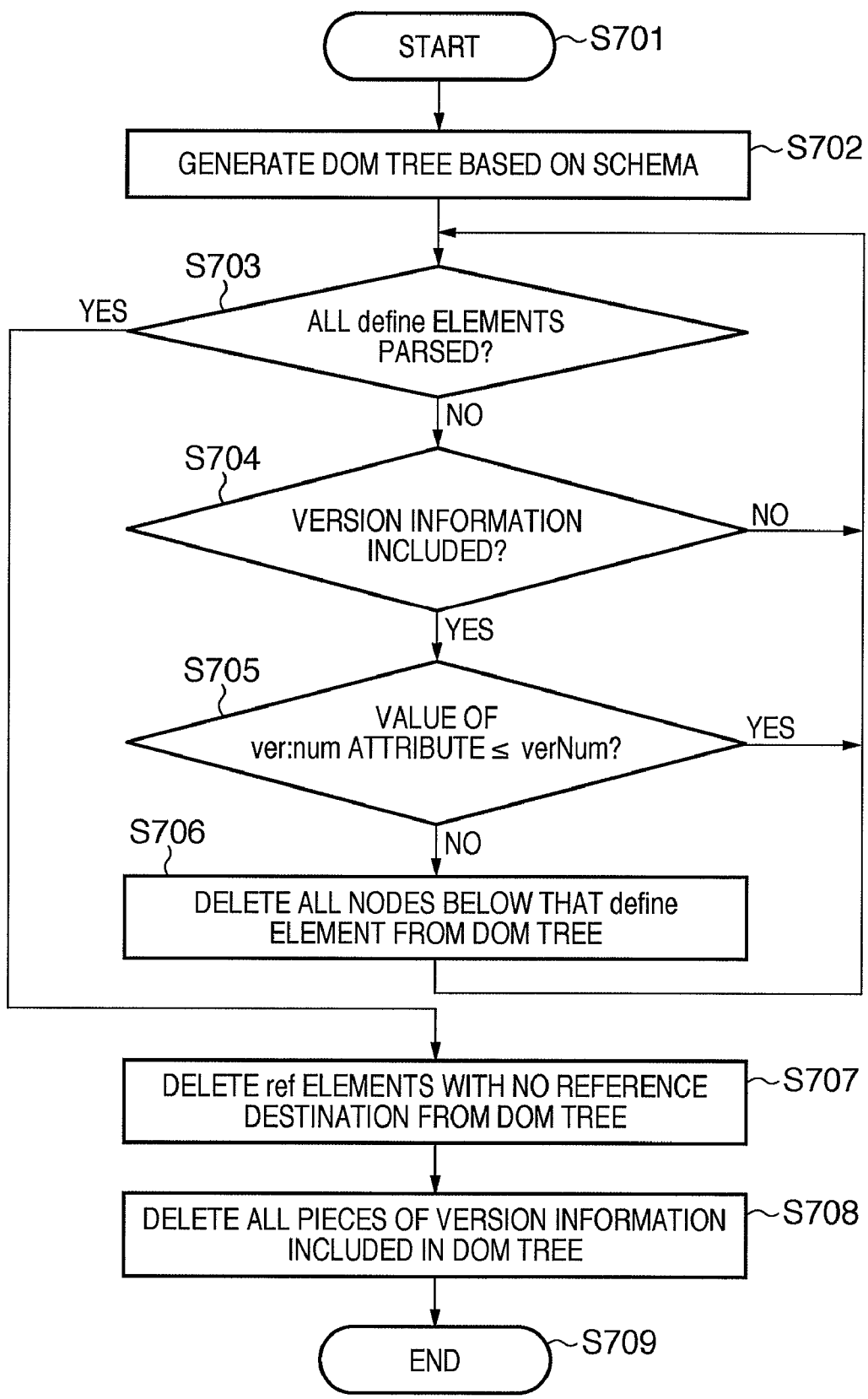
FIG. 22 is an overall flowchart of DOM tree generation according to the third embodiment.

FIG. 22 is an overall flowchart of DON tree generation according to the third embodiment.

In step S702, a DOM tree of all elements is generated based on the schema data shown in FIG. 23, and is saved in an internal memory (all-element tree generation unit).

It is checked in step S703 if all "define" elements as child elements of a "grammar" element have been parsed. If it is determined that all "define" elements have been parsed, the process jumps to step S707; otherwise, a "define" element to be parsed is selected, and the process advances to step S704.

It is checked in step S704 if the "define" element includes version information. If it is determined that the "define" element which is being parsed includes version information, the process advances to step S705. If it is determined that the "define" element does not include any version information, the process returns to step S703.

It is checked in step S705 if the value of a "ver:num" attribute of the "define" element is equal to or smaller than the version number "verNum" of a structured document. If it is determined that the value of the "ver:num" attribute of the "define" element is not equal to or smaller than the version number "verNum" of the structured document, the process advances to step S706. If it is determined that the value of the "ver:num" attribute of the "define" element is equal to or smaller than the version number "verNum" of the structured document, the process returns to step S703.

In step S706, all nodes below the "define" element are deleted from the DOM tree of the schema (element deletion unit) After that, the process returns to step S703.

In step S707, for all "ref" elements, if there is no "define" element to be referred from a "ref" element of interest, that "ref" element is deleted from the DON tree of the schema.

In step S708, all pieces of version information are deleted from the DON tree that has undergone the process in step S707. After that, the processing ends (step S708).

FIGS. 24, 25, and 26 are views showing schemata after the processing described with reference to FIG. 22 is applied to structured documents of ver0.1, ver0.2, and ver0.3, respectively. As shown in FIGS. 24, 25, and 26, "define" elements which are not required for validation checking are deleted from the corresponding schema according to the version of the structured document, and "ref" elements referring to "define" elements are also deleted. Also, all pieces of version information are deleted from the schema by the process in step S709.

As described in detail above, based on a version number designated from the application, the information processing apparatus according to the third embodiment can generate a DOM tree of a schema for that version from the single schema data. That is, the DOM tree of the schema specialized to the designated version number is built according to the sequence described with reference to FIG. 22.

For this reason, based on the built DOM tree, the validation check processing that has been described in the first embodiment with reference to FIG. 13 can be executed.

Fourth Embodiment

Figure 27:
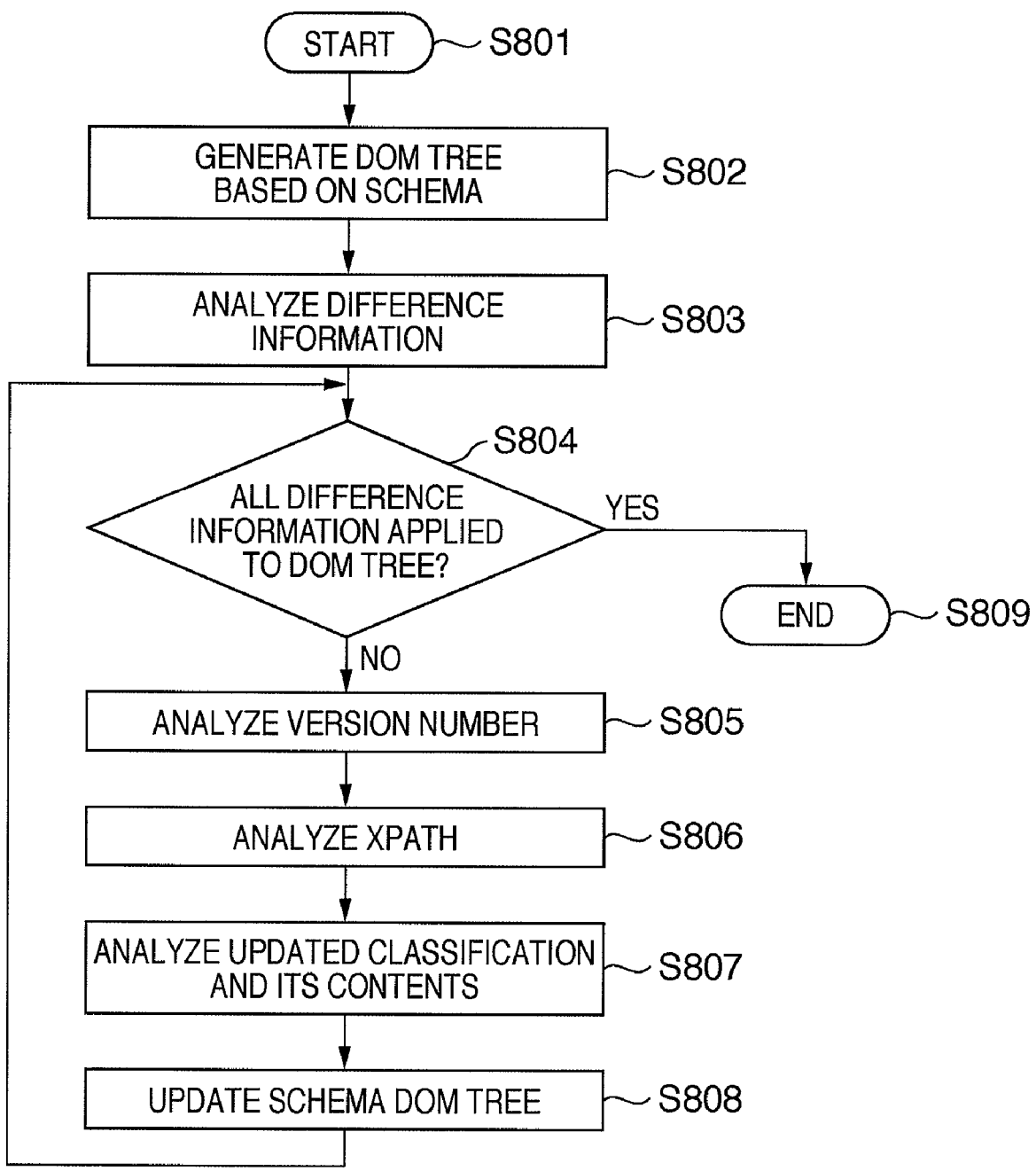
FIG. 27 is a flowchart showing creation process of DOM tree of schema data that manages a plurality of versions, based on externally provided difference information.
Figure 28:
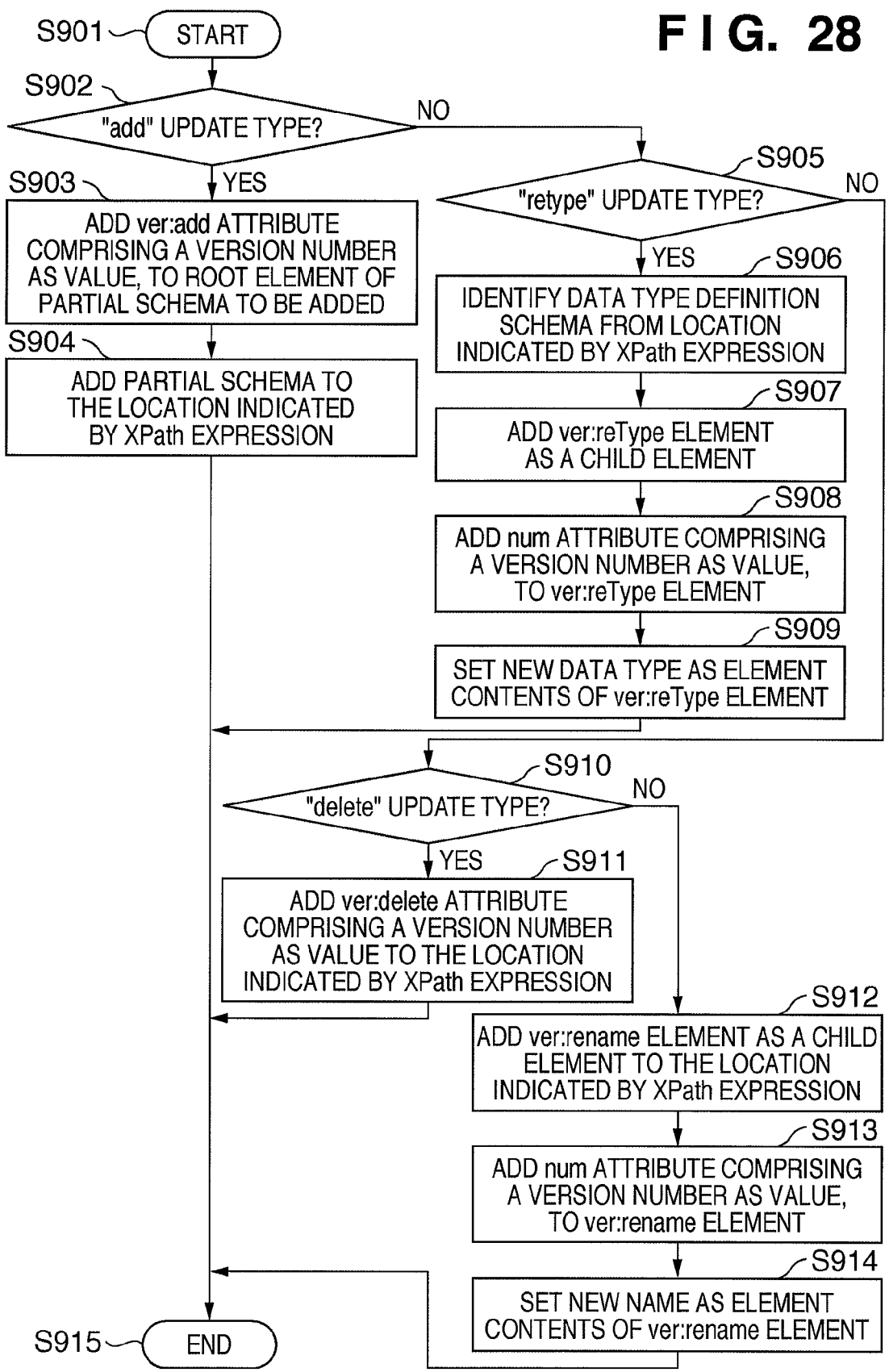
FIG. 28 is a flowchart showing the detailed process of step S808.

The fourth embodiment will explain a method for creating schema that manages a plurality of versions automatically as in FIG. 12, when a file marked with only the difference information is given from external. FIGS. 27 and 28 are flowcharts, which show the sequential flow of the method.

In step S802, DOM tree is generated based on a analysis of the schema data file. In step S803, difference information file, which only has the difference information showed in FIG. 29, is analyzed. In this difference information file, updated version number, updated location described using XPath expression, updated type such as add, delete, rename, retype, and its updated contents, are recorded.

In step S804, whether DOM tree of the schema data is updated based on each line of the difference information file is determined.

In case it is decided that the DOM tree of the schema data is not updated at all based on the difference information file, version number of first column is analyzed in step S805. Then, updated location of XPath expression in the second column is analyzed (S806). Next, updated type in the third column, and updated contents in the fourth column are analyzed. Then, based on information obtained by analysis on steps S805 to S807, DOM tree of the schema data is updated (S808).

FIG. 28 is a flowchart showing detailed process of step S808.

In step S902, it is determined whether updated type is "add". In case it is determined updated type is "add", ver:add attribute comprising version number as value is added to the element corresponding to the root element of the partial schema which is the updated contents showed in FIG. 29 (S903). Then, partial schema updated in S903 is added to the schema data file at the location indicated by XPath expression (S904).

FIG. 30 is a view showing a schema data file updated based on first column of difference information. In this schema data file, updated partial schema which ver:add attribute is added based on to partial schema of updated contents is added to the schema data file as sub element of the schema data file at the location represented by XPath expression "/book/person".

In step S905, it is determined whether update type is "retype". If update type is "retype", data type definition schema is identified based on the location indicated by XPath expression (S906). Then, ver:reType element is added as a child element to data type definition schema (S907), set num attribute comprising a version number as value (S908), and set a new data type as element content (S909).

In FIG. 29, because update type is "retype" in the second column, data element which defines data type of value of id attribute is identified based on the schema of "id" attribute at the location indicated by XPath expression "/book/person@id". Then, ver:reType element is added as a child element of the identified data element, and num attribute with value 0.2 and new data type "unsignedInt" are set as data content for the identified data element. By executing the successive processes to schema data shown in FIG. 30, schema data shown in FIG. 31 is derived.

In step S910, it is determined whether update type is "delete". In case update type is "delete", ver:delete attribute comprising a version number as value, is added to location indicated by XPath expression (S911). In FIG. 29, because the update type is "delete" in third column, ver:delete attribute with value 0.3 is added to schema of id attribute at the location indicated by XPath expression "/book/person@id". By executing the successive processes to the schema data shown in FIG. 30, schema data shown in FIG. 31 is derived.

In case update type is not "delete" in step S910, ver:rename element is added to location indicated by XPath expression as a child element (S912). Then, num attribute comprising a version number as value, is added to the ver:rename element (S913), and new name is set as element content (S914).

In FIG. 29, because the update type is "rename" in the fourth column, ver:rename element is added as a child element to element at the location indicated by XPath expression "/book/person/phone". Then, num attribute with value 0.3 is added to ver:rename element, and new name "PHONE" is set as element content. By executing the successive processes on schema to the schema data shown in FIG. 30, schema data shown in FIG. 12 is derived.

As described above, schema that manages a plurality of versions as illustrated in FIG. 12, is generated automatically, by using an external file only recorded with difference information.

Other Embodiments

The preferred embodiments of the present invention have been explained, and the present invention may be applied to either a system constituted by a plurality of devices, or an apparatus consisting of a single device.

Note that the present invention can also be achieved when a program that implements the functions of the aforementioned embodiments is directly or remotely supplied to a system or apparatus, and that system or apparatus reads out and executes the supplied program code. Therefore, the technical scope of the present invention also includes the program code itself to be installed in a computer so as to make computer implement the functional processing of the present invention.

In this case, the form of program is not particularly limited, and an object code, a program to be executed by an interpreter, script data to be supplied to an OS, and the like may be used as long as they have the program function.

As a recording medium for supplying the program, for example, a Floppy® disk, hard disk, optical disk (CD, DVD), magneto-optical disk, magnetic tape, nonvolatile memory card, ROM, and the like may be used.

As another program supply method, the program can be supplied when the user establishes a connection to a homepage on the Internet using a browser of a client computer and downloads the computer program of the present invention from the homepage. Also, the program can be supplied when the user downloads a compressed file that includes an automatic installation function to a recording medium such as a hard disk or the like. Also, the program codes that form the program of the present invention may be segmented into a plurality of files, which may be downloaded from different homepages. That is, the claims of the present invention include a WWW server which makes a plurality of users download program files required to implement the functional processing of the present invention by the computer.

Furthermore, a storage medium such as a CD-ROM or the like, which stores the encrypted program of the present invention, may be delivered to the users. The user who has cleared a predetermined condition may be allowed to download key information that decrypts the program from a homepage via the Internet, and may execute the encrypted program using that key information to be installed on a computer, thus implementing the present invention.

The functions of the aforementioned embodiments can be implemented when the computer executes the readout program. In addition, an OS or the like, which runs on the computer, executes some or all of actual processes based on an instruction of the program, thereby implementing the functions of the aforementioned embodiments.

Furthermore, the program read out from the recording medium is written in a memory equipped on a function expansion board or function expansion unit, which is inserted in or connected to the computer. After that, a CPU or the like equipped on that function expansion board or unit executes some or all of actual processes, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-262729, filed Oct. 5, 2007, and No. 2008-257437, filed Oct. 2, 2008, which is hereby incorporated by reference herein in its entirety.

What is claimed is:

1. An information processing apparatus, which generates schema data that defines a structure including elements and attributes described in structured document data, comprising:
   input unit for inputting schema data of a first version, and schema data of a second version newer than the first version;
   detection unit for detecting an element of a part different between the schema data of the first version and the schema data of the second version, and a difference type;
   generation unit for generating single schema data by adding the detected element and the difference type to the schema data of the first version together with information indicating the second version;
   storage unit that stores the generated single schema data; and
   control unit for generating single schema data by recursively processing, in ascending order, from schema data corresponding to a first version to schema data corresponding to a latest version by said input unit, said detection unit, and said generation unit for N schema data (N is a positive integer not less than 3) corresponding to N types of versions
   wherein the single schema data is generated in XML.

2. The apparatus according to claim 1, wherein the difference type is one of addition of an element, deletion of an element, change of a name of an element, and change of a data type of an element content.

3. The apparatus according to claim 1, wherein the difference type is one of addition of an attribute, deletion of an attribute, change of a name of an attribute, and change of a data type of an attribute value.

4. A document verification apparatus, which comprises a storage unit that stores single schema data generated by an information processing apparatus, and checks validation of structured document data using the single schema data, the document verification apparatus comprising:
   input unit for inputting structured document data;
   version determination unit for determining a version of the input structured document data;
   tree generation unit for reading out the single schema data from the storage unit, and using the single schema data to generate a DOM tree of a schema corresponding to the determined version; and
   verification unit for executing validation checking of the structured document based on the generated DOM tree,
   wherein the information processing apparatus generates the single schema data by:
   inputting schema data of a first version, and schema data of a second version newer than the first version;
   detecting an element of a part different between the schema data of the first version and the schema data of the second version, and a difference type; and generating single schema data by adding the detected element and the difference type to the schema data of the first version together with information indicating the second version, and wherein the single schema data is generated by recursively processing, in ascending order, from schema data corresponding to a first version to schema data corresponding to a latest version by said inputting, said detecting, and said generating for N schema data (N is a positive integer not less than 3) corresponding to N types of versions.

5. The apparatus according to claim 4, wherein said generation unit comprises:
all-element tree generation unit for generating a DON tree of all elements included in the single schema data; and
element deletion unit for deleting, from the DOM tree, elements which are not required in the validation checking of structured document data of the version determined by said version determination unit.

6. The apparatus according to claim 5, wherein said element deletion unit deletes, from the DOM tree, the elements which are not required in accordance with difference types appended to elements of the single schema data based on information indicating versions appended together with the difference types and the version determined by said version determination unit.

7. The apparatus according to claim 4, wherein said tree generation unit generates the DOM tree based on the version determined by said version determination unit by sequentially parsing difference types and information indicating versions, which are appended to elements included in the single schema data.

8. The apparatus according to claim 1, wherein said generation unit comprises:
schema generation unit for generating said single schema data by editing based on difference information which contains difference of location, difference of type, and difference of contents, from first version of schema data.

9. The apparatus according to claim 8, wherein said generation unit comprises:
adding unit for adding partial schema corresponding to elements and attributes to the updated location in the schema data,
deleting unit for deleting partial schema corresponding to elements and attributes at the updated location from the schema data;
rename unit for renaming the name of elements and attributes at the updated location in the schema data; and
data type changing unit for changing data type definition of elements contents and attributes at the updated location in the schema data.

10. The apparatus according to claim 8, wherein said updated location is stated using XML Path Language (XPath).

11. The apparatus according to claim 1, wherein said structured document data is described with Extensible Markup Language (XML).

12. The apparatus according to claim 1, wherein said schema data is described with XML Schema, or RELAX NG.

13. A method of controlling an information processing apparatus, which generates schema data that defines a structure including elements and attributes described in structured document data, comprising:
an input step of inputting schema data of a first version, and schema data of a second version newer than the first version;

a detection step of detecting an element of a part different between the schema data of the first version and the schema data of the second version, and a difference type;
a generation step of generating single schema data by adding the detected element and the difference type to the schema data of the first version together with information indicating the second version; and
a control step of generating single schema data by recursively processing, in ascending order, from schema data corresponding to a first version to schema data corresponding to a latest version in the input step, the detection step, and the generation step for N schema data (N is a positive integer not less than 3) corresponding to N types of versions
wherein the single schema data is generated in XML.

14. The method according to claim 13, wherein the difference type is one of addition of an element, deletion of an element, change of a name of an element, and change of a data type of an element content.

15. The method according to claim 13, wherein the difference type is one of addition of an attribute, deletion of an attribute, change of a name of an attribute, and change of a data type of an attribute value.

16. A method of controlling a document verification apparatus, which comprises a storage unit that stores single schema data, and checks validation of structured document data using the single schema data, comprising:
an input step of inputting structured document data;
a version determination step of determining a version of the input structured document data;
a tree generation step of reading out the single schema data from the storage unit, and using the single schema data to generate a DOM tree of a schema corresponding to the determined version; and
a verification step of executing validation checking of the structured document based on the generated DOM tree, wherein the single schema data is generated by:
inputting schema data of a first version, and schema data of a second version newer than the first version;
detecting an element of a part different between the schema data of the first version and the schema data of the second version, and a difference type; and
generating single schema data by adding the detected element and the difference type to the schema data of the first version together with information indicating the second version, and
wherein the single schema data is generated by recursively processing, in ascending order, from schema data corresponding to a first version to schema data corresponding to a latest version in the inputting, the detecting, and the generating for N schema data (N is a positive integer not less than 3) corresponding to N types of versions.

17. The method according to claim 16, wherein the generation step comprises:
an all-element tree generation step of generating a DOM tree of all elements included in the single schema data; and
an element deletion step of deleting, from the DOM tree, elements which are not required in the validation checking of structured document data of the version determined in the version determination step.

18. The method according to claim 17, wherein in the element deletion step, the elements which are not required are deleted from the DOM tree in accordance with difference types appended to elements of the single schema data based on information indicating versions appended together with the difference types and the version determined in the version determination step.

19. The method according to claim 16, wherein in the tree generation step, the DOM tree is generated based on the version determined in the version determination step by sequentially parsing difference types and information indicating versions, which are appended to elements included in the single schema data.

20. A computer program that is stored in a computer-readable recording medium, for causing a computer to execute a method of controlling an information processing apparatus, which generates schema data that defines a structure including elements and attributes described in structured document data, the method comprising:
   an input step of inputting schema data of a first version, and schema data of a second version newer than the first version;
   a detection step of detecting an element of a part different between the schema data of the first version and the schema data of the second version, and a difference type;
   a generation step of generating single schema data by adding the detected element and the difference type to the schema data of the first version together with information indicating the second version; and
   a control step of generating single schema data by recursively processing, in ascending order, from schema data corresponding to a first version to schema data corresponding to a latest version in the input step, the detection step, and the generation step for N schema data (N is a positive integer not less than 3) corresponding to N types of versions
   wherein the single schema data is generated in XML.

21. A computer program that is stored in a computer-readable recording medium, for causing a computer to execute a method of controlling a document verification apparatus, which comprises a storage unit that stores single schema data and checks validation of structured document data using the single schema data, the method comprising:
   an input step of inputting structured document data;
   a version determination step of determining a version of the input structured document data;
   a tree generation step of reading out the single schema data from the storage unit, and using the single schema data to generate a DOM tree of a schema corresponding to the determined version; and
   a verification step of executing validation checking of the structured document based on the generated DOM tree,
   wherein the single schema data is generated by:
   inputting schema data of a first version, and schema data of a second version newer than the first version;
   detecting an element of a part different between the schema data of the first version and the schema data of the second version, and a difference type; and
   generating single schema data by adding the detected element and the difference type to the schema data of the first version together with information indicating the second version, and
   wherein the single schema data is generated by recursively processing, in ascending order, from schema data corresponding to a first version to schema data corresponding to a latest version in the inputting, the detecting, and the generating for N schema data (N is a positive integer not less than 3) corresponding to N types of versions.

* * * * *